US012807460B2

(12) United States Patent
Mosolf et al.

(10) Patent No.: US 12,807,460 B2
(45) Date of Patent: Nov. 24, 2026

(54) TOWER CRANE, METHOD AND CONTROL UNIT FOR OPERATING A TOWER CRANE, TROLLEY AND TROLLEY TRAVEL UNIT

(71) Applicant: Wolffkran Holding AG, Cham (CH)

(72) Inventors: Viktor Mosolf, Malsch (DE); Alexey Müller, Schwarzach (DE)

(73) Assignee: Wolffkran Holding AG, Cham (CH)

( * ) Notice: Subject to any disclaimer, the term of this patent is extended or adjusted under 35 U.S.C. 154(b) by 153 days.

(21) Appl. No.: 18/681,817

(22) PCT Filed: Aug. 18, 2022

(86) PCT No.: PCT/EP2022/073029
§ 371 (c)(1),
(2) Date: Feb. 6, 2024

(87) PCT Pub. No.: WO2023/025643
PCT Pub. Date: Mar. 2, 2023

(65) Prior Publication Data

US 2025/0136417 A1 May 1, 2025

(30) Foreign Application Priority Data

Aug. 23, 2021 (DE) ..................... 10 2021 121 818.7

(51) Int. Cl.
*B66C 13/46* (2006.01)
*B66C 11/16* (2006.01)
(Continued)

(52) U.S. Cl.
CPC .............. *B66C 13/46* (2013.01); *B66C 11/16* (2013.01); *B66C 13/063* (2013.01); *B66C 13/48* (2013.01); *B66C 23/022* (2013.01)

(58) Field of Classification Search
CPC ....... B66C 13/46; B66C 11/16; B66C 13/063; B66C 13/06
See application file for complete search history.

(56) References Cited

U.S. PATENT DOCUMENTS 3,596,772 A 8/1971 Pingon
9,002,508 B2 4/2015 Cameron
(Continued)

FOREIGN PATENT DOCUMENTS

DE 4402787 A1 3/1995
DE 69518566 T2 4/2001
(Continued)

OTHER PUBLICATIONS

International Search Report for PCT Application No. PCT/EP2022/073029, dated Jan. 19, 2023.
(Continued)

*Primary Examiner* — Jess Whittington
*Assistant Examiner* — Josephine Rich
(74) *Attorney, Agent, or Firm* — Andrus Intellectual Property Law, LLP

(57) ABSTRACT

A tower crane has a control unit which operates a rotating mechanism, a hoisting mechanism, and a trolley in dependence on at least one angle of rotation, in dependence on at least one first angle of deflection, in dependence on the at least one second angle of deflection, and in dependence on a difference in angle of rotation.

20 Claims, 12 Drawing Sheets

(51) Int. Cl.

| | |
|---|---|
| ***B66C 13/06*** | (2006.01) |
| ***B66C 13/48*** | (2006.01) |
| ***B66C 23/02*** | (2006.01) |

(56) References Cited

U.S. PATENT DOCUMENTS

| | | | | |
|---|---|---|---|---|
| 2005/0103738 | A1 | 5/2005 | Recktenwald | |
| 2019/0119078 | A1* | 4/2019 | Palberg | B66C 13/063 |
| 2020/0140239 | A1* | 5/2020 | Schoonmaker | G06T 7/521 |
| 2021/0122615 | A1* | 4/2021 | Rauscher | B66C 13/063 |
| 2022/0194749 | A1* | 6/2022 | Englert | B66C 13/085 |

FOREIGN PATENT DOCUMENTS

| | | | | |
|---|---|---|---|---|
| DE | 102006001279 | A1 | 7/2007 | |
| DE | 102018005068 | A1 * | 1/2020 | B66C 13/063 |
| DE | 202019102393 | U1 | 6/2020 | |
| DE | 102019122796 | A1 | 3/2021 | |

OTHER PUBLICATIONS

Search Report for German Patent Application No. 102021121818.7, created May 23, 2022.

* cited by examiner

TOWER CRANE, METHOD AND CONTROL UNIT FOR OPERATING A TOWER CRANE, TROLLEY AND TROLLEY TRAVEL UNIT

CROSS-REFERENCE TO RELATED APPLICATIONS

This application is the U.S. national stage application of International Application No. PCT/EP2022/073029, filed on Aug. 18, 2022, which international application was published on Mar. 3, 2023, as International Publication WO 2023/025643 A1 in the English language. The international application is incorporated herein by reference, in its entirety. The international application claims priority from German Patent Application No. 102021121818.7, filed on Aug. 23, 2021, which is incorporated herein by reference, in its entirety.

The invention relates to a tower crane, a method and a control unit for operating a tower crane, a trolley for a tower crane and a trolley for a tower crane.

Advances in the field of tower cranes are described.

The technical problems of the prior art are solved by a tower crane according to claim 1, by a method and a control unit for operating a tower crane according to dependent claims, a trolley for a tower crane according to another dependent claim, and a trolley for a tower crane according to yet another dependent claim. Advantageous embodiments can be found in the dependent claims, the following description and in the drawings in the Figures.

A first aspect of the description relates to a tower crane, which comprises: a tower having a vertical axis; a trolley boom projecting from the tower; a rotating mechanism for rotating at least the trolley boom about the vertical axis; a sensor device for determining an angle of rotation of the trolley boom about the vertical axis; a trolley movable along the trolley boom and having at least a first and a second deflection pulley for a hoisting cable; a load receiving means having at least one deflection pulley for the hoisting cable; a sensor device arranged on the load receiving means for determining at least a first deflection angle of the load receiving means with respect to the perpendicular running through the load receiving means; the hoisting cable which, starting from a hoisting mechanism, is guided at least over the first deflection pulley of the trolley, the at least one deflection pulley of the load receiving means and the second deflection pulley of the trolley, and which is fastened to a distal section of the trolley boom; the hoisting mechanism; a sensor device disposed on the trolley for detecting at least a second angle of deflection of at least a section of the hoist cable located between the trolley and the load receiving means with respect to the perpendicular passing through the trolley; a trolley connected by a trolley cable to the trolley for movement thereof along the trolley boom; a sensor device for determining a rotational angle difference between the rotational angle of the trolley boom about the vertical axis and the rotational angle of the trolley about the vertical axis; and a control unit which operates the rotating mechanism, the hoisting mechanism and the trolley in dependence on at least the rotational angle, in dependence on the at least one first deflection angle, in dependence on the at least one second deflection angle and in dependence on the rotational angle difference.

The tower crane provided enables, by means of the sensor variables provided, the load position to be determined accurately and in real time during crane operation to reduce swaying of the load. The proposed tower crane forms the basis for the consolidation, preparation and computer processing of sensor data in order to determine a precise actual position picture. Estimates of important variables to be controlled, such as angles, are avoided by sensor data fusion, and any errors possibly occurring in individual sensor data are compensated for by data fusion. For sensor fusion, different data are determined on the trolley, the load receiving means and on the boom by means of the sensor devices.

If the crane operator moves the load using a joystick, he no longer has to manually try to reduce the pendulum movements that would otherwise occur. Thus, an assistance system can be provided that advantageously allows the load to be moved at a high speed without the crane operator having to take into account a swaying of the load. With the proposed crane, loads can therefore be lowered more quickly, which has a beneficial effect in terms of time on the work processes at the construction site.

An advantageous example is characterized by the fact that the sensor device for determining the difference in the angle of rotation is fixedly arranged with respect to the trolley boom, in particular on the trolley boom or on a frame of the trolley travelling winch.

The rigid connection to the trolley boom improves a measurement of the difference in the angle of rotation. The connection to the trolley frame simplifies the assembly and installation of the tower crane.

An advantageous example is characterized in that a sensor signal generated by the sensor device for determining the difference in the angle of rotation represents a distance between the sensor device and a section of the trolley cable which section is located between a pulley fixed proximal to the trolley boom and the trolley, wherein the difference in the angle of rotation is being determined by means of the control unit in dependence on the sensor signal representing the distance.

Bending of the trolley boom affects the rotational position of the trolley depending on the position of the trolley along the trolley boom. The position of the section of the trolley cable represents an offset of the trolley to an angle of rotation around a vertical axis of the tower. Thus, the actual rotational position of the trolley in relation to the vertical axis can be determined without any further sensors.

An advantageous embodiment is characterized by the fact that the sensor device for determining the difference in the angle of rotation starting from the tower is arranged in a first or proximal half, in particular in the first or proximal third, of the length of the trolley boom.

The bending of the trolley boom plays a greater role the further away the trolley is from the tower. If, on the other hand, the trolley is closer to the tower, the bending of the trolley boom plays a subordinate role. Therefore, the proposed arrangement of the sensor device in the first half or first third is advantageous. This also enables integration with the trolley travelling winch.

An advantageous example is characterized in that a sensor signal generated by the sensor device for determining the at least one second deflection angle represents a distance between the sensor device and the at least one section of the hoisting cable; and wherein the at least one second deflection angle is determined by means of the control unit as a function of the sensor signal representing the distance.

Advantageously, by measuring the distance, the at least one second deflection angle can be measured in a simple manner.

An advantageous example is characterized in that the tower crane comprises: a further sensor device arranged on the trolley for determining at least one angle of inclination of the trolley to a horizontal; and wherein the control unit additionally operates the rotating mechanism, the hoisting mechanism and the trolley in dependence on the at least one angle of inclination.

Due to the non-linear bending of individual boom segments of the trolley boom, it is difficult to derive the angle of inclination by simple mathematical linearizations. The proposed sensory detection of the tilt angle improves the accuracy of the downstream regulation.

A second aspect of the description relates to a method of operating a tower crane, comprising: Determining at least a first pendulum angle characterizing a deflection of a virtual center of gravity of a multiple pendulum suspended from the trolley towards a perpendicular passing through the trolley in a first spatial plane; determining at least a second pendulum angle characterizing a deflection of the center of gravity of the multiple pendulum towards the perpendicular passing through the trolley in a second spatial plane; determining at least one angle of rotation of the trolley about the vertical axis of the tower; and determining at least one actuating variable for operating the tower crane, in particular by means of at least one rotating mechanism, at least one hoisting mechanism and at least one trolley, as a function of the at least one first pendulum angle, as a function of the at least one second pendulum angle and as a function of the at least one angle of rotation.

Due to the determination of the pendulum angles and the angle of rotation of the trolley, it is possible to derive the load position and to implement a near-real-time regulation on the basis of a regulation model representing the crane and the load movement.

The approach presented advantageously dispenses with the use and derivation of process variables. Instead, the actual load situation on the crane and below the crane boom is determined by means of the pendulum angle and the angle of rotation of the trolley. By means of sensor fusion, the influences of the double pendulum usually found in crane operations on the regulation of the load movement are reduced or eliminated.

By means of the proposed method, a simplified virtual single pendulum system is obtained—irrespective of the complexity of the mechanical design of the arrangement below the trolley—which can be operated with simpler regulation algorithms and, above all, without the determination of torsional and bending moments specific to the crane structure. The proposed method can advantageously be applied to a variety of different tower crane configurations without the need for costly adaptations of the method to the design of the crane.

Furthermore, in addition to a position-related regulation of the load, i.e. a specification of a trajectory for the load, the proposed method or system enables the simultaneous possibility of a speed-related regulation of the load. This makes it comparable to the current speed-related crane control by means of PLC, and makes it more accessible for the crane operators. With PLC control, the crane operators specify a speed for the respective drives by means of joystick commands. With speed-related regulation of the load, the crane operator would specify a speed for the load by joystick command. Thus, an assistance system for the crane operator can be provided. On the other hand, the proposed method or system enables fully automated travel. Thus, the system proposed herein can be used for a more intuitive manual control as well as for a semi- or fully automated control and provides the necessary basis for this.

An advantageous example comprises: determining an angle of deflection, lying in the first plane, of at least a section of the hoisting cable located between the trolley and the load receiving means to the perpendicular passing through the trolley; determining an angle of deflection, lying in the first plane, of the load receiving means suspended from the trolley by means of the hoisting cable to the perpendicular passing through the load receiving means; wherein the first pendulum angle is determined as a function of the angle of deflection of the at least one section of the hoisting cable lying in the first plane and as a function of the angle of deflection of the load receiving means lying in the first plane.

The precise determination of the pendulum angle is improved by this sensor fusion. Unwanted oscillations in the sensor signals are reduced by the sensor fusion.

An advantageous example comprises: Determining a first weighting factor as a function of a pendulum length; wherein the first pendulum angle is determined by weighting the deflection angle of the section of the hoist cable lying in the first plane as a function of the first weighting factor, and by weighting the deflection angle of the load receiving means lying in the first plane as a function of the first weighting factor.

Advantageously, the pendulum length is used to reduce vibrations caused by the design of the trolley and the load receiving means at different pendulum lengths for the determination of the variables.

An advantageous example comprises: determining an angle of inclination of the trolley with respect to the horizontal; determining a compensated deflection angle lying in the first plane as a function of the angle of inclination of the trolley and as a function of the deflection angle lying in the first plane of the at least one section of the hoisting cable; wherein the first pendulum angle is determined as a function of the compensated deflection angle lying in the first plane of the at least one section of the hoisting cable and as a function of the deflection angle lying in the first plane of the load receiving means.

This sensor fusion accurately accounts for the trolley boom deflection, which varies depending on the position of the trolley, the load and the design of the trolley boom.

An advantageous example comprises: determining a deflection angle, which is lying in the second plane, of the at least one section of the hoisting cable located between the trolley and the load receiving means with respect to the perpendicular passing through the trolley; determining a deflection angle, which is lying in the second plane, of the load receiving means suspended from the trolley by means of the hoisting cable with respect to the perpendicular passing through the load receiving means; and wherein the second deflection angle is determined as a function of the deflection angle lying in the second plane and as a function of the deflection angle of the load receiving means lying in the second plane.

This sensor fusion improves the precise determination of the pendulum angle. Unwanted oscillations in the sensor signals are reduced by the sensor fusion.

An advantageous example comprises: Determining a second weighting factor as a function of the pendulum length; and wherein the second deflection angle is determined by weighting the deflection angle of the at least one section of the hoist cable lying in the second plane as a function of the second weighting factor, and by weighting the deflection angle of the load receiving means lying in the second plane as a function of the second weighting factor.

Advantageously, the pendulum length is used to reduce vibrations caused by the design of the trolley and the load receiving means at different pendulum lengths for the determination of the actuating variables.

An advantageous example comprises: determining a length of one of the sections of the hoisting cable between the trolley and the load receiving means; and determining the pendulum length as a function of the length of one of the sections of the hoisting cable and a predetermined length of a load cable between the load receiving means and the load, which length can be predetermined in particular manually during operation.

The predetermined length of the load cable compensates for the inaccuracy in determining the total length of the multiple pendulum. This reduces the total error. As long as the total error remains in the range of approximately ±10% of the total length of the multiple pendulum, a sufficiently damped control is ensured. This behavior of the load attached to the load receiving means by means of attaching means has been empirically proven by test trials.

If the length of the section of the hoisting cable is 40 m and the length of the load cable is 5 m, the total length is 45 m. The regulator can therefore tolerate an inaccuracy of ±4.5 m without any problem. In most cases this leads to the desired regulating behavior. Exceeding this tolerance leads to a slight overshoot, but it is still smaller than it would be without the proposed regulation.

An advantageous example comprises: Determining an angle of rotation of the trolley boom about the vertical axis; determining a difference in the angle of rotation between the angle of rotation of the trolley boom about the vertical axis and the angle of rotation of the trolley about the vertical axis; and wherein the angle of rotation of the trolley about the vertical axis of the tower is determined as a function of the angle of rotation of the trolley boom and as a function of the difference in the angle of rotation.

This sensor fusion improves the precise determination of the angle of rotation of the trolley.

An advantageous example is characterized in that the determination of the at least one actuating variable is activated when at least one of the following conditions occurs: presence of at least one target value variable other than zero; presence of a manual activation—originating from a control unit—of the determination of the at least one actuating variable; and presence of a request for readjustment.

An advantageous example comprises: updating a model, in particular matrices characterizing the model, as a function of the pendulum length, as a function of a position of the trolley and as a function of a mass associated with the multiple pendulum, in particular determined by means of a sensor device; and wherein the determining of the at least one actuating variable is carried out as a function of the updated model.

Advantageously, the position of the trolley, the measured mass and the pendulum length allow for an update of the model.

An advantageous example comprises: Updating a regulator, in particular gain factors, as a function of the model, in particular matrices characterizing the model, and as a function of the pendulum length; and wherein the determining of the at least one actuating variable is performed as a function of the updated regulator.

A third aspect of the description relates to a control unit for operating a tower crane, comprising: means for determining at least a first pendulum angle which characterizes a deflection of a virtual center of gravity of a multiple pendulum suspended from a trolley with respect to a perpendicular passing through the trolley in a first spatial plane; means for determining at least a second pendulum angle characterizing a deflection of the center of gravity of the multiple pendulum with respect to the perpendicular passing through the trolley in a second spatial plane; means for determining at least one angle of rotation of the trolley with respect to the vertical axis of the tower; and means for determining at least one actuating variable for operating the tower crane, in particular by means of at least one rotating mechanism, at least one hoisting mechanism and at least one trolley of the tower crane, as a function of the at least one first pendulum angle, as a function of the at least one second pendulum angle and as a function of the at least one angle of rotation.

A fourth aspect of the description relates to a trolley for a tower crane, comprising: a chassis for moving the trolley along a trolley boom; at least two pulleys fixedly arranged to the chassis for deflecting a hoisting cable towards a load receiving means; and a sensor device fixedly arranged to the chassis for determining at least one angle of deflection of a section of the hoisting cable located between the trolley and a load receiving means with respect to a vertical passing through the trolley.

The determination of the at least one deflection angle of the hoisting cable at the trolley allows for precise determination of the load situation.

An advantageous example is characterized in that at least one sensor signal generated by the sensor device represents a distance between the sensor device and at least one section of the hoisting cable.

Due to the determination of the distance, the deflection angle can be determined more precisely—in particular in comparison to a camera measurement.

An advantageous example is characterized in that at least two sensors are assigned to the at least one section of the hoisting cable, which sensors are directed at the section of the hoisting cable from different angles.

By having two sensors spaced apart from each other, both the measurement itself is improved, as well as error handling in the event of inconsistent sensor signals is made possible.

An advantageous example is characterized in that at least part of the sensor device is arranged between the at least two sections of the hoisting cable.

This provides a more compact sensor device. Furthermore, the sensor device is arranged in a protected manner in a proximal area of the trolley. Furthermore, individual sensors can be integrated to form a unit.

An advantageous example comprises: at least one further sensor device arranged fixedly with respect to the trolley for generating at least one further sensor signal which characterizes an inclination of the trolley to a horizontal.

Advantageously, the precise determination of the angle of deflection which is arranged in a plane which is spanned by the tower and trolley boom can be improved by sensor fusion in this way.

A fifth aspect of the description relates to a trolley carriage for mounting on a trolley boom of a tower crane, the trolley carriage comprising: a frame; a drive unit fixedly arranged with respect to the frame for winding and unwinding a trolley cable; and a sensor device fixedly arranged with respect to the frame for detecting a difference in the angle of rotation between an angle of rotation of the trolley boom about a vertical axis of a tower of the tower crane and an angle of rotation of the trolley about the vertical axis.

Advantageously, the sensor device for determining the difference in the angle of rotation is integrated into the trolley carriage. Therefore, the sensor device does not have to be arranged separately on the trolley boom. Consequently, the structure of the crane is simplified.

An advantageous example is characterized in that a sensor signal generated by the sensor device for determining the difference in the angle of rotation represents a distance between the sensor device and a section of the trolley cable.

Bendings of the trolley boom affects the rotational position of the trolley depending on the position of the trolley along the trolley boom. The position of the section of the trolley cable represents an offset of the trolley with respect to an angle of rotation around a vertical axis of the tower. In this way, the actual rotational position of the trolley in relation to the vertical axis can be determined without the need for any further sensors.

In the Drawings:

FIG. 1 schematically depicts a tower crane;

FIGS. 2, 3, 16 and 19 each show a pendulum system;

FIG. 4 depicts a feedback of sensor signals;

FIGS. 5 and 6 each show a determination of actuating variables;

FIGS. 7 and 10 each show a trolley schematically;

FIGS. 8 and 11 each show a determination of the position of a section of a hoisting cable by means of a sensor device;

Figure 15:
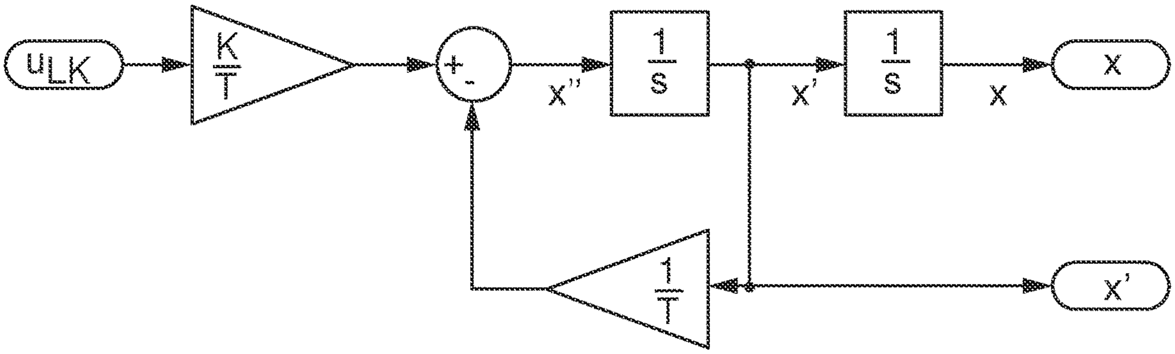
Figure 17:
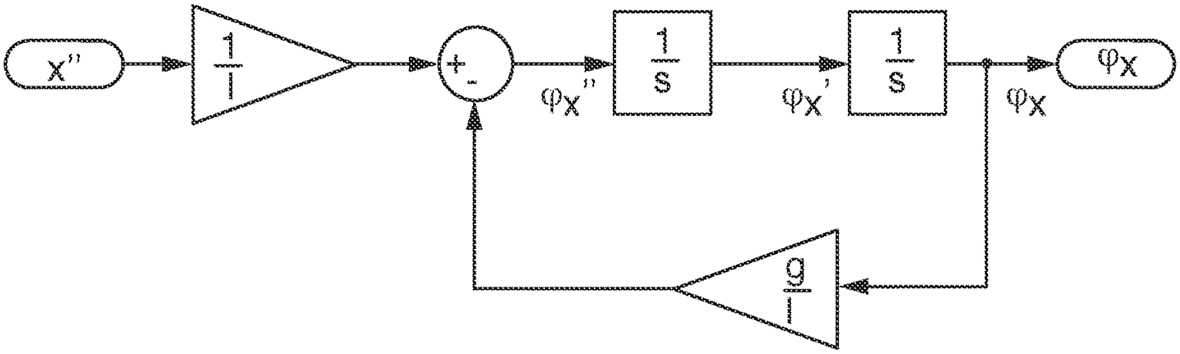
Figure 18:
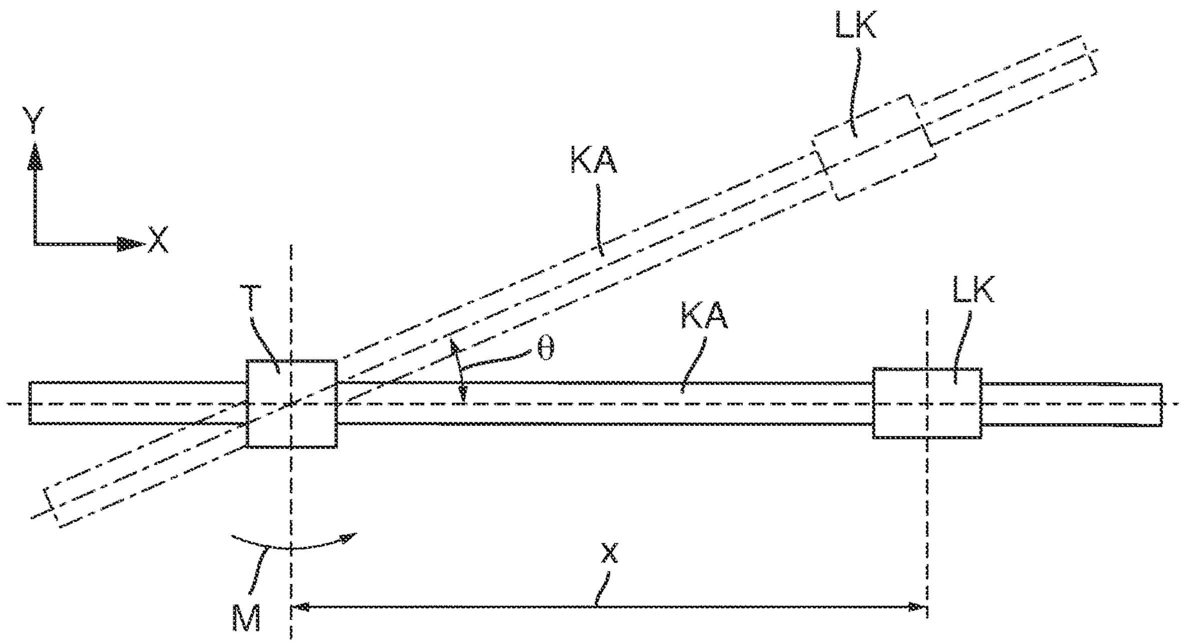

FIGS. 15 and 17 each show a signal flow diagram;

FIG. 18 depicts a top view of the tower crane; and

Figure 20:
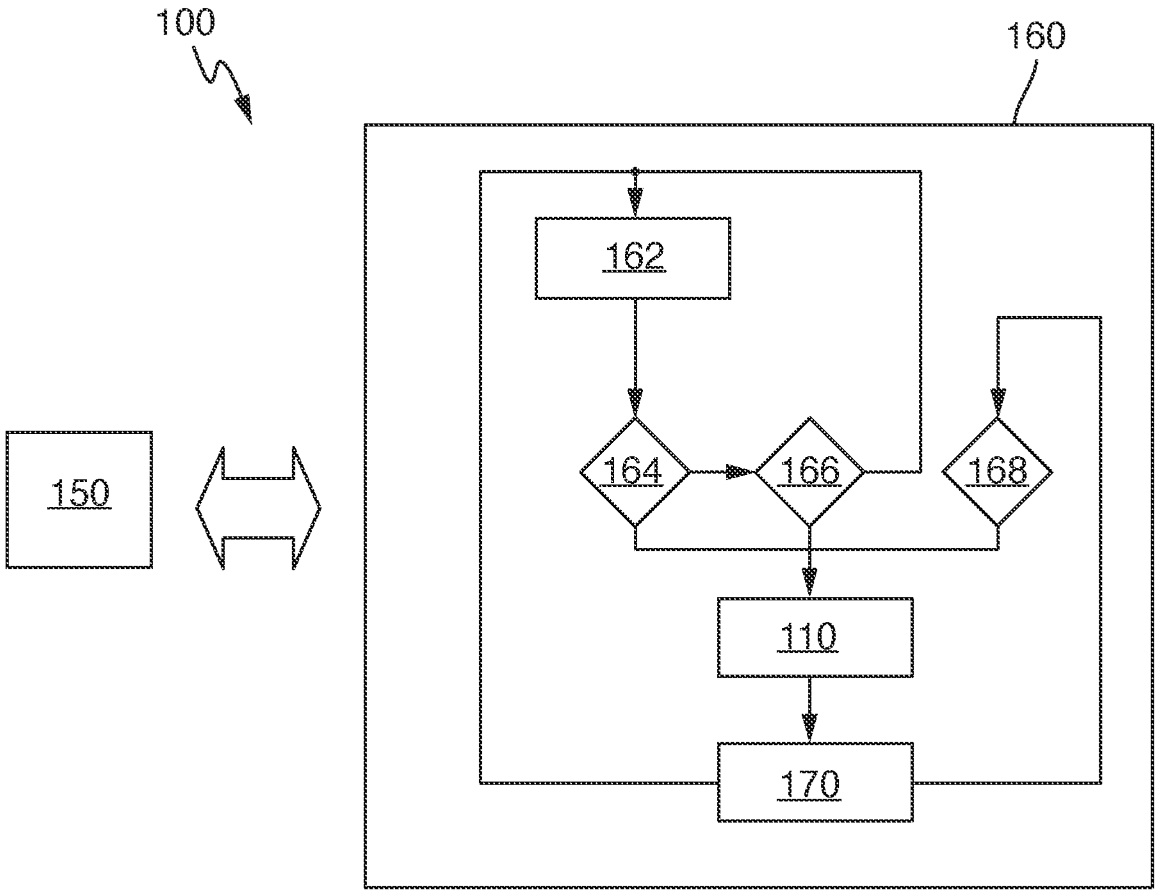

FIG. 20 depicts a control unit for operating the tower crane.

Figure 1:
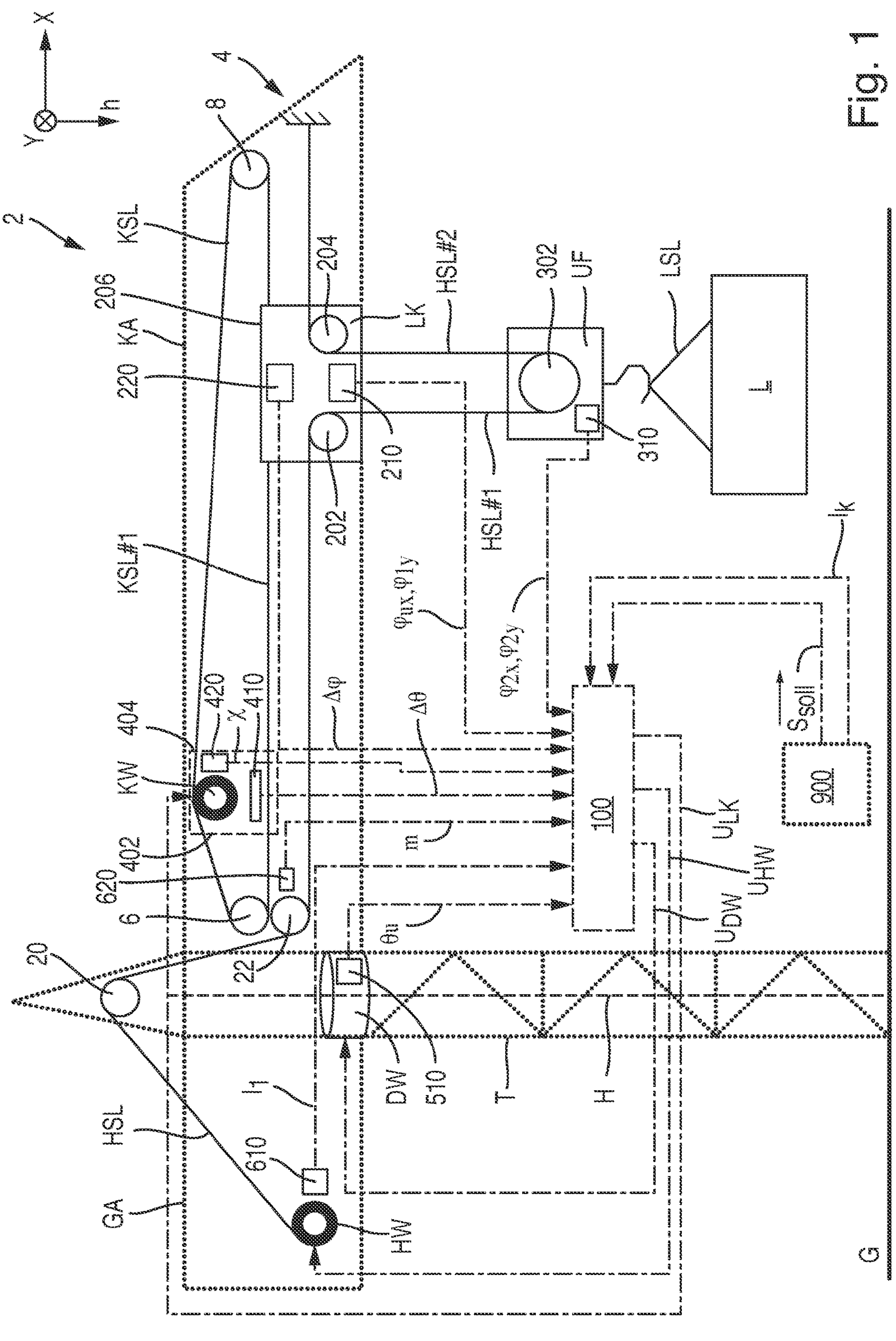

FIG. 1 depicts a schematic side view of a revolving tower crane 2 for lifting, moving and setting down a load L. The revolving tower crane 2 comprises a tower T with an imaginary vertical axis H and a trolley boom KA projecting from the tower T, at least part of which tower is fixedly arranged to a ground G. In FIG. 1, the trolley boom KA is designed not to teeter. In an example not shown, the trolley boom KA can also be designed to teeter, wherein the teetering trolley boom KA is moved by means of a teetering drive.

The tower crane 2 comprises a rotating mechanism DW arranged, for example, on a counter boom GA for rotating at least the trolley boom KA about the vertical axis H. The tower crane 2 comprises a sensor device 510, for example designed in the form of an angle of rotation sensor, for determining an angle of rotation $\theta_u$ of the trolley boom KA about the vertical axis H in an yx plane.

A trolley LK which is movable along the trolley boom KA comprises a first and a second deflection pulley 202, 204 for deflecting a hoisting cable HSL in the direction of a load receiving means UF, which can also be referred to as a bottom block or hook block. The load receiving means UF comprises at least one deflection pulley 302 for the hoisting cable HSL, but may also comprise a plurality of deflection pulleys for the hoisting cable HSL.

A sensor device 310 arranged on the load receiving means UF, for example in the form of a gyroscope, is set up to determine a first deflection angle $\varphi\_2x$, $\varphi\_2y$ of the load receiving means UF relative to the perpendicular running through the load receiving means UF.

The hoisting cable HSL is guided starting from a hoisting mechanism HW for winding and unwinding the hoisting cable over the first deflection pulley 202 of the trolley LK, the one deflection pulley 302 of the load receiving means UF and the second deflection pulley 204 of the trolley LK. The hoisting cable HSL is attached to a distal section 4 of the trolley boom KA.

The hoisting mechanism HW comprises a brake, an electric motor, a gearbox and a winch. The hoisting cable HSL is rolled up on the winch of the hoisting mechanism HW in order to raise the load L, and it is unrolled in order to lower the load L. The hoisting cable HSL is attached to a distal section 4 of the trolley boom KA, for example. The hoisting cable HSL is guided, for example, starting from the hoisting mechanism by means of two deflection pulleys 20 and 22 arranged at or near the vertical axis H up to the deflection pulley 202 of the trolley LK.

According to FIG. 1, a sensor device 620 is coupled to the deflection pulley 22 and detects its deflection in the xy-plane, which changes depending on the mass m of the suspended load L or of the multiple pendulum below the trolley LK. The sensor device 620 measures, for example, a tensile force exerted on the pulley 22. A sensor signal determined by the sensor device 620 represents the mass M.

A sensor device 210 arranged on the trolley LK is arranged for determining a second deflection angle $\varphi\_1y$, $\varphi\_ux$ of a section HSL #1, HSL #2 of the hoisting cable HS located between the trolley LK and the load receiving means UF with respect to the perpendicular passing through the trolley LK. A sensor signal generated by the sensor device 210 for determining the second deflection angle $\varphi\_1y$, $\varphi\_ux$ represents a distance between the sensor device 210 and the section HSL #1, HSL #2 of the hoisting cable HSL. The second deflection angle $\varphi\_1y$, $\varphi\_ux$ is determined by means of the control unit 100 in dependence on the sensor signal of the sensor device 210 representing the distance.

A trolley carriage KW arranged stationary relative to the trolley boom KA is connected to the trolley LK by means of a trolley cable KSL for its movement along the trolley boom KA. The trolley carriage KW comprises a brake, an electric motor, a gearbox and a double winch, wherein the double winch comprises two sections connected by means of a common axis, which, when the double winch rotates in one direction of rotation, rolls up one part of the trolley cable KSL, unrolls the other part and thus moves the trolley LK.

Fixed to the frame 402 is a sensor device 420, for example an angle of rotation sensor that counts the rotations, which sensor device generates a sensor signal that characterizes the position x of the trolley LK.

A sensor device 410 is arranged for determining a rotational angle difference $\Delta\theta$ between the rotational angle $\theta_u$ of the trolley boom KA about the vertical axis H and the rotational angle of the trolley LK about the vertical axis H. The sensor device 410 for determining the difference in the angle of rotation $\Delta\theta$ is fixedly arranged to the trolley boom KA, in particular on the trolley boom KA or on a frame 402 of the trolley carriage KW. A sensor signal generated by the sensor device 410 for determining the difference in the angle of rotation $\Delta\theta$ represents a distance between the sensor device 410 and a section KSL #1 of the trolley cable KSL, which is located between a deflection pulley 6 fixed proximal to the trolley boom KA and the trolley LK. A deflection pulley 8 arranged distal to the trolley boom KA deflects the trolley cable KSL from the trolley carriage KW to the trolley LK. The difference in the angle of rotation $\Delta\theta$ is determined by means of the control unit 100 as a function of the sensor signal representing the distance. The sensor device 410 is arranged starting from the tower T in a first or proximal half, in particular in the first or proximal third, of the length of the trolley boom KA.

For reasons of clarity, the arrangement of the sensor device 410 for determining a difference in the angle of rotation $\Delta\theta$ is shown schematically in FIG. 1 parallel to the vertical axis z at a distance from the trolley cable KSL. In the embodiment explained in the previous paragraph, the sensor device 410 is arranged perpendicular to the plane of projection at a distance from the trolley cable KSL. Of course, other embodiments of the sensor device 410 are also conceivable, for example a sensor arranged as illustrated, which sensor observes the deflection of the trolley cable KSL from vertically above or from vertically below, for example optically, and determines the signal representing the difference in the angle of rotation $\Delta\theta$.

The trolley carriage KW comprises the frame 402 and a drive unit fixed to the frame 402 for winding and unwinding a trolley cable KSL. The sensor device 410, which is fixed to the frame 402, is arranged for determining the difference in angle of rotation $\Delta\theta$ between an angle of rotation θ_u of the trolley boom KA about a vertical axis H of a tower T of the tower crane 2 and an angle of rotation θ of the trolley LK about the vertical axis H. The sensor device 410 is arranged for determining the difference in angle of rotation $\Delta\theta$ between the angle of rotation θ_u of the trolley boom KA about the vertical axis H and the angle of rotation θ of the trolley LK about the trolley boom KA. The sensor signal generated by the sensor device 410 for determining the angle of rotation difference $\Delta\theta$ represents a distance between the sensor device 410 and a section KSL #1 of the trolley cable KSL.

A control unit 100 operates the rotating mechanism DW, the hoisting mechanism HW and the trolley carriage KW as a function of the angle of rotation θ_u, as a function of the first deflection angle φ_2x, φ_2y, as a function of the second deflection angle φ_1y, φ_ux and as a function of the angle of rotation difference Δ0.

A further sensor device 220, which is arranged fixedly on the trolley LK, in particular in relation to its chassis, and which is designed, for example, as a gyroscope, serves to determine an angle of inclination $\Delta\varphi$ of the trolley LK in relation to a horizontal. The sensor device 220 determines a sensor signal which characterizes an inclination of the trolley LK to a horizontal, in particular an angle of inclination to a horizontal plane lying in an xh plane which is spanned by the vertical axis and longitudinal axis of the trolley boom. The control unit 100 additionally operates the rotating mechanism DW, the hoisting mechanism HW and the trolley carriage KW as a function of the angle of inclination $\Delta\varphi$.

The multiple pendulum suspended from the trolley LK is explained with respect to FIG. 2 and FIG. 3 below, which multiple pendulum comprises the two sections HSL #1, HSL #2 of the hoisting cable HSL, the load receiving means UF suspended from the hoisting cable HSL, a load cable LSL arranged on the load receiving means UF, and the load L arranged on the load cable LSL. In the case of a double trolley operation, the same applies, wherein the multiple reeving of the hoisting cable gives the pendulum underneath three or more deflection pulleys on the trolleys as reference points on the boom side. In this context, a multiple or double pendulum is understood to be the arrangement located below the trolley or below the deflection pulleys of the trolley.

A length l_1 is determined by means of a sensor 610, for example an angle of rotation sensor that counts revolutions, which is associated with the hoisting mechanism HW. For example, by detecting the rotational position of the hoisting mechanism HW, the distance between the load receiving means UF and the trolley LK can be concluded.

A length l_k of the load cable LSL between the load receiving means UF and the load L can be preset, for example, by means of a control unit 900. The control unit 900 is, for example, a control panel or a remote control. By means of a joystick of the control unit 900, target variables S_soll are implicitly transmitted to the control unit 100.

Figure 2:
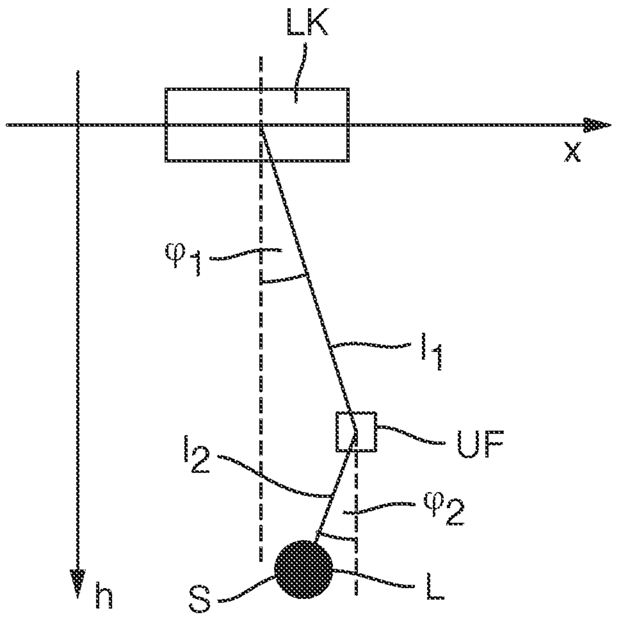

FIG. 2 depicts a schematic illustration of the double pendulum present in the tower crane of FIG. 1. With respect to this double pendulum, which is made up of all components below the trolley LK, there are two angles $\varphi_1$, $\varphi_2$ of the cables to the respective perpendicular and two lengths $l_1$, $l_2$ of the cables.

While $l_1$ and the angle $\varphi_1$ are relatively easy to measure, the length $l_2$ between the load receiving means UF and the load L as well as the mass m of the load and a center of gravity S of the mass of the load always remain variable during operation. Also, the angle $\varphi_1$ is not trivially detectable as a measured variable. And even if one were to estimate the length $l_2$, there is a regulation inaccuracy which is not insignificant, and which regulation inaccuracy continues to cause the system to oscillate when the drives are actively controlled.

Figure 3:
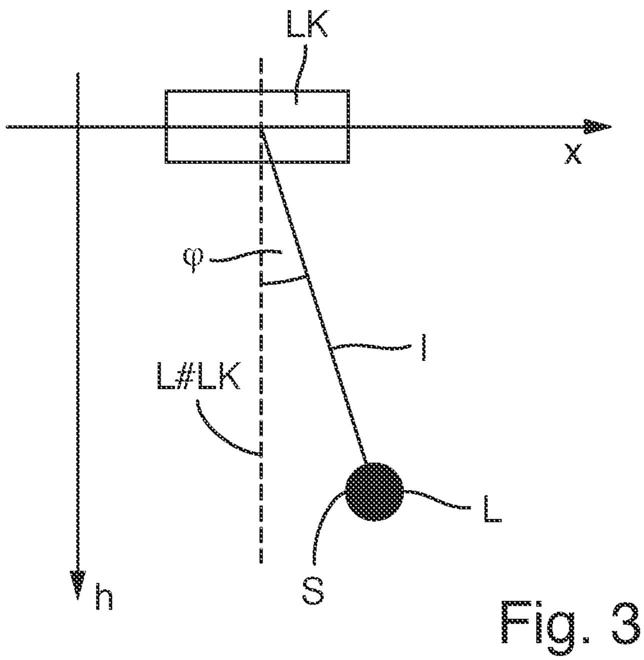

FIG. 3 depicts the simplification proposed in this description for the consideration of the multiple pendulum to prevent or reduce a movement of the pendulum. The multiple pendulum shown in FIG. 2 is considered as a single pendulum. In this case one variable is the angle of deflection of the load with respect to the trolley. This angle of deflection cannot be measured by use of simple sensors such as cameras or ultrasonic sensors or laser-based distance measuring systems, since an actual pendulum angle T cannot be found in reality on any of the objects physically present in crane operation. This pendulum angle T is determined in approximation on the basis of sensor measurements. The regulation described below is based, among other things, on the consideration of the following variables:

φ pendulum angle between the straight line pointing to the virtual center of gravity S of the load and the perpendicular L #LK in the middle of the trolley LK;

l distance between the trolley and the virtual center of gravity S of the virtual load L;

S virtual center of gravity of the virtual load L; and m mass of the virtual load L.

Figure 4:
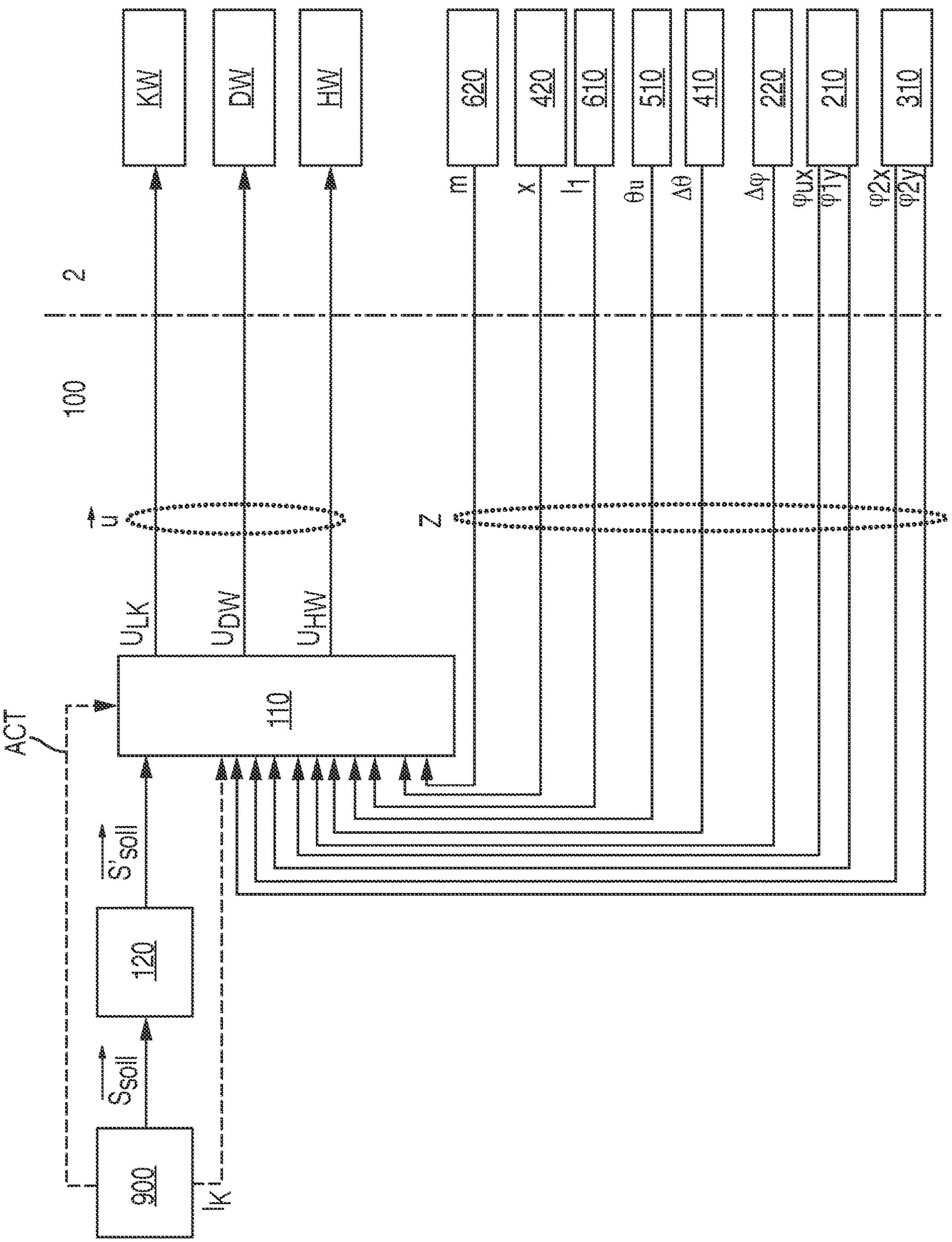

FIG. 4 depicts, n the basis of FIG. 1, the determination of actuating variables or actuating speeds u by means of a determination unit 110. The respective actuating speed is provided, for example, in percent (%) of the maximum speed for the respective drive. At least the sensor data and target variables S'_soll are fed to the determination unit 110 in order to determine the drive speeds u. A determination unit 120 determines the target variables S'_soll as a function of target value variables S_soll originating from the control unit 900, wherein the individual target value variables S_soll are being multiplied by a gain factor.

Further, it is possible to output a signal ACT to the determination unit 110 by means of the control unit 900, which activates the determination unit and the executed regulation. For example, lifted loads can be moved manually, wherein the control unit 100 regulates the tower crane in such a way that it prevents the load from swinging up during manual movement.

Figure 5:
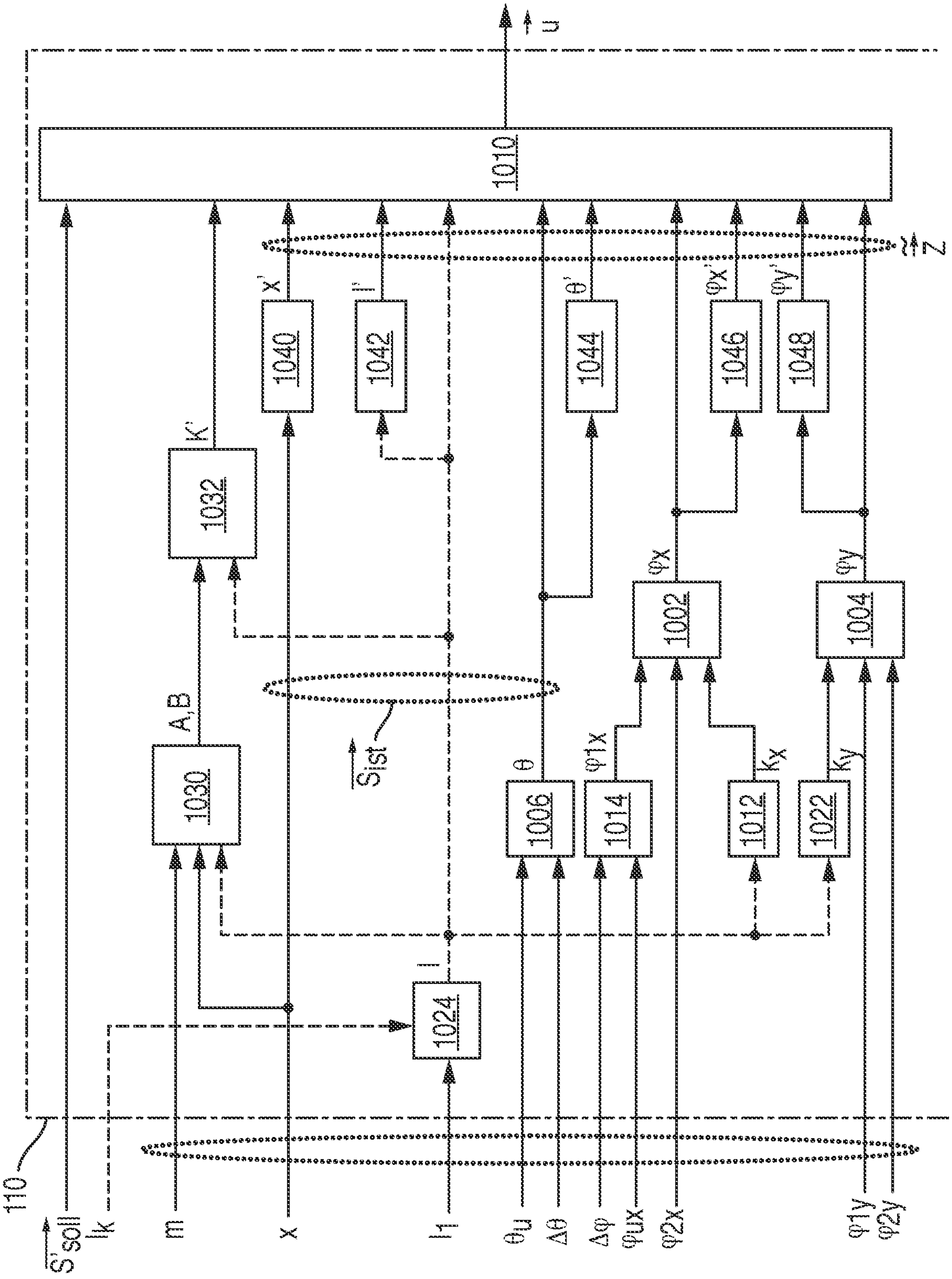

FIG. 5 depicts an embodiment of the determination unit 110 of FIG. 4. Means 1002 are arranged to determine a first pendulum angle φ_x, which characterizes a deflection of the virtual center of gravity of the multiple pendulum suspended on the trolley relative to a perpendicular running through the trolley in a first imaginary spatial plane xh, which is spanned by the vertical axis of the tower of the tower crane. Means 1004 are arranged to determine a second pendulum angle φ_y, which characterizes a deflection of the center of gravity of the multiple pendulum relative to the perpendicular running through the trolley in a second imaginary spatial plane, which is a perpendicular plane of the first spatial plane xh and which runs parallel to the vertical axis H. Means 1006 determine the angle of rotation θ of the trolley about the vertical axis of the tower as a function of the angle of rotation θ_u of the trolley boom and as a function of the difference in angle of rotation Δθ.

Further means 1010 serve to determine the actuating variable u for operating the tower crane, in particular the rotating mechanism, the hoisting mechanism and the trolley, as a function of the first pendulum angle φ_x, as a function of the second pendulum angle φ_y and as a function of the angle of rotation θ.

Means 1024 are arranged in order to determine the pendulum length l as a function of the length l_1 of the sections of the hoisting cable, and as a function of the length l_k of the load cable between the load receiving means and the load which length l_k is pre-settable in particular manually during operation.

Means 1012 are arranged to determine a first weighting factor kx as a function of the pendulum length l, wherein the first pendulum angle φ_x is determined by weighting the angle of deflection φ_ux, which is lying in the first plane, of the section HSL #1, HSL #2 of the hoisting cable HSL as a function of the first weighting factor kx and by weighting the angle of deflection φ_2x, which is lying in the first plane, of the load receiving means UF as a function of the first weighting factor kx.

Means 1014 are arranged to determine a compensated deflection angle φ_1x lying in the first plane xh as a function of the angle of inclination Δφ of the trolley and as a function of the deflection angle φ_ux lying in the first plane of the section of the hoisting cable, wherein the means 1002 are arranged to determine the first pendulum angle φ_x by weighting the compensated deflection angle φ_ux lying in the first plane as a function of the first weighting factor kx and by weighting the deflection angle φ_2x of the load-carrying means lying in the first plane as a function of the first weighting factor.

Means 1022 are arranged to determine a second weighting factor ky as a function of the pendulum length l, wherein the means 1004 are arranged to determine the second deflection angle φ_y by weighting the deflection angle φ_1y, lying in the second plane yh, of the section of the hoisting cable as a function of the second weighting factor ky and by weighting the deflection angle φ_2y, lying in the second plane yh, of the load receiving means UF as a function of the second weighting factor ky.

Means 1030 are arranged to update a model, in particular of matrices A,B characterizing the model, as a function of the pendulum length l, of the position x of the trolley and as a function of the mass m associated with the multiple pendulum. Means 1032 are used to update a regulator, determining a matrix of gain factors K', as a function of the model, in particular of the matrices A, B characterizing the model, and as a function of the pendulum length l. The determination of the variable u_LK, u_DW, u_HW is performed as a function of the updated regulator.

According to a respective block 1040, 1042, 1044, 1046 and 1048, a respective derivative x', l', θ', φ_x', φ_y' of the respectively supplied variable is determined. Alternatively, the variable x' can also be supplied directly.

The means 1010 determines the actuating variables u as a function of the matrix K', the target variables S'_soll, the pendulum length l', the pendulum angles, the angle of rotation of the trolley, and as a function of the derivatives x', l', θ', φ_x', φ_y'.

Figure 6:
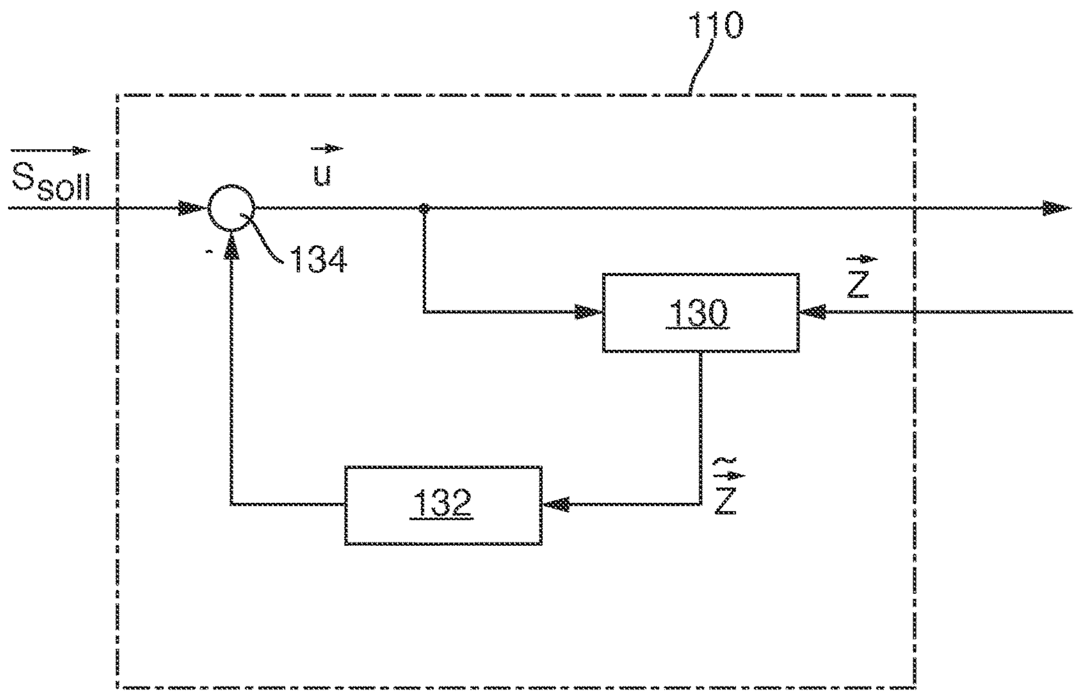

FIG. 6 depicts a further example of the determination unit 110. In contrast to FIG. 5, the determination unit 110 comprises an observer 130 to which the determined drive speeds u and measurement signals Z are fed. The observer determines the state vector Z~. A state regulator 132 and an adder 134 determine the drive speeds u to be set as a function of the state vector Z~ and the target variables S_soll. For example, a transposed gain vector K' is generated by a pole placement method:

$$K' = \begin{bmatrix} K(1) \\ K(2) \\ K(3) \end{bmatrix}$$

A state vector for the trolley, where x' corresponds to the actual velocity of the LK, is given by $$\vec{\tilde{Z}} = [\,x' \quad \varphi_x \quad \varphi_x'\,] -$$

The actuating speed u_LK then results, for example, in:

$$u_{LK} =$$

$$x'_{soll} * K(1) - \vec{\tilde{Z}} * K' = x'_{soll} * K(1) - (x' * K(1) + \varphi_x * K(2) + \varphi_x' * K(3)) ==$$

$$x'_{soll} * K(1) - x' * K(1) - \varphi_x * K(2) - \varphi_x' * K(3) =$$

$$(x'_{soll} - x') * K(1) - \varphi_x * K(2) - \varphi_x' * K(3) = -1 * [(x' - x'_{soll})\varphi_x \varphi_x'] * K'$$

Figure 7:
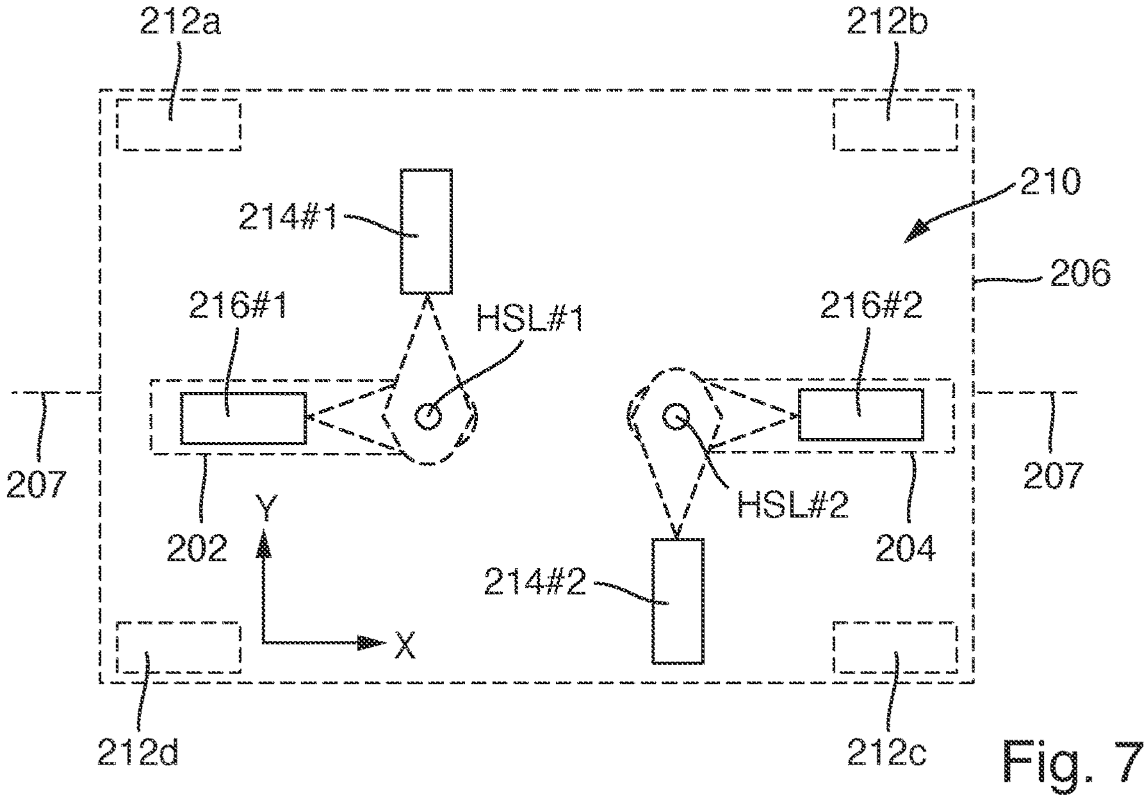

In other words, if actual-target-differences are formed in the state vector, Phi_soll and Phi_dot_soll are equal to zero, and then multiplication with the gain vector K' is performed, which results in the scalar actuating speed. The unit of FIG. 7 depicts a schematically illustrated example of a structure of the trolley LK. A carriage 206 is provided for moving the trolley LK along a travel axis 207 of the trolley boom. For example, the carriage 206 comprises a plurality of wheels 212*a-d* which are movably mounted on rails of the trolley boom. At least two deflection pulleys 202, 204, which are fixed with respect to the carriage 206, are arranged for deflecting the hoisting cable in the direction of a load receiving means UF.

The sensor device 210, which is fixedly arranged with respect to the carriage 206, is set up to determine the deflection angles φ_1y, φ_ux of the sections HSL #1, HSL #2 of the hoisting cable, which are located between the trolley LK and a load receiving means, with respect to the perpendicular running through the trolley LK. A sensor signal generated by the sensor device 210 represents a distance between the sensor device 210 or parts thereof and the respective section HSL #1, HSL #2 of the hoisting cable located between the deflection pulleys 202, 204 of the trolley LK and the deflection pulley or pulleys of the load receiving means.

Two or more sensors 214 #1, 216 #1; 214 #2, 216 #2 are associated with the respective section HSL #1, HSL #2 of the hoisting cable, which sensors are directed from different angles to the section HSL #1, HSL #2 of the hoisting cable HSL.

In an example not shown, the sensor device 210 is arranged at least in part between the two sections HSL #1, HSL #2 of the hoisting cable.

On the trolley LK, sensors 214 #1, 216 #1, 214 #2, 216 #2 are arranged for detecting the cable angle φ_1, for example as ultrasonic sensors, LiDAR sensors or other sensors for measuring the distance between the respective sensor 214 #1, 216 #1, 214 #2, 216 #2 and the associated section HSL #1, HSL #2. In the example shown, the sensors 214 #1, 216 #1; 214 #2, 216 #2 are aligned in pairs perpendicularly to the sections HSL #1, HSL #2 in the respective axial direction X or Y. Thus, the cable deflection is measured with respect to the position of the sensor.

Since the sensors 214 and 216 are aligned against each other on the same or parallel axis, all non-parallel cable deflections can be calculated. The deflections of the cables against each other are thus compensated for metrologically. These are e.g. the different formations of a trapezoidal arrangement of the two sections HSL #1, HSL #2 between the trolley LK and the load receiving means occurring during lifting and lowering operation. This effect can be calculated by determining the cable length between the trolley and the load receiving means.

Figure 8:
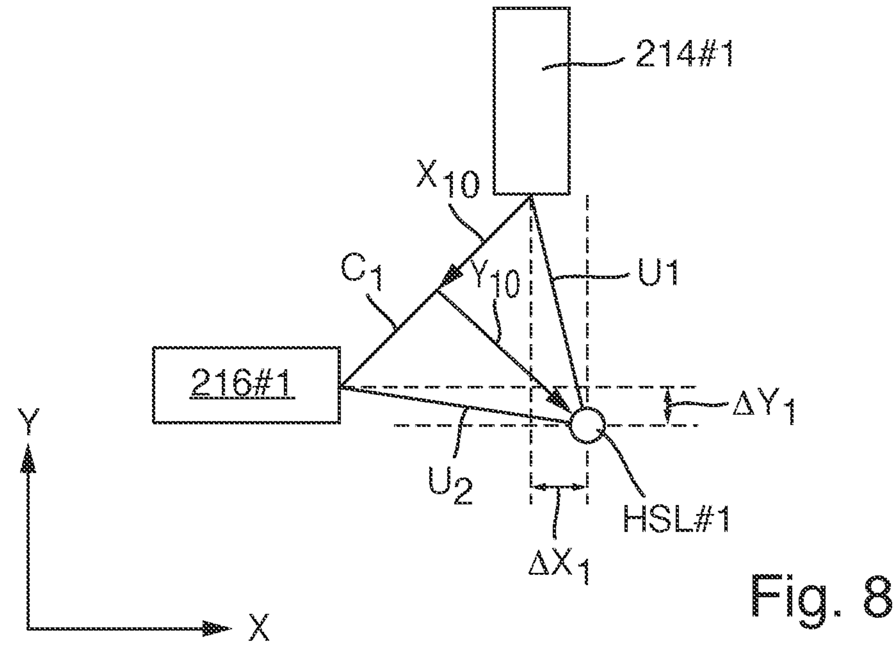

FIG. 8 depicts in schematic form the calculation of the distance of the sensors to the section HSL #1 of the hoisting cable using the example of the two sensors 214 #1, 216 #1. The sensors 214 #1, 216 #1, which are assigned to the respective cable section HSL #1, are aligned in pairs to each other in such a way that a resulting distance C_1 is at an angle of 45° with respect to the coordinate system of the crane.

Based on the measured values U_1 and U_2 representing a respective distance of the cable section HSL #1 with respect to the respective sensor 214 #1, 216 #1, the following equations can be derived:

$$U_1^2 = X_{10}^2 + Y_{10}^2 \tag{1}$$

$$U_2^2 = Y_{10}^2 + (C_1 - X_{10})^2 \tag{2}$$

Equations (1) and (2) with respect to $Y_{10}^2$ und $X_{10}^2$ result in:

$$X_{10}^2 = U_1^2 - Y_{10}^2 \tag{1}$$

$$Y_{10}^2 = U_2^2 - (C_1 - X_{10})^2 \tag{2}$$

Substituting equation (4) into equation (3) provides X_10 as follows:

$$X_{10}^2 = U_1^2 - \left(U_2^2 - (C_1 - X_{10})^2\right) \tag{1}$$

$$X_{10}^2 = U_1^2 - U_2^2 + (C_1 - X_{10})(C_1 - X_{10})$$

$$X_{10}^2 = U_1^2 - U_2^2 + \left(C_1^2 - 2 \cdot C_1 \cdot X_{10} + X_{10}^2\right)$$

$$X_{10}^2 = U_1^2 - U_2^2 + C_1^2 - 2 \cdot C_1 \cdot X_{10} + X_{10}^2$$

$$0 = U_1^2 - U_2^2 + C_1^2 - 2 \cdot C_1 \cdot X_{10}$$

$$-U_1^2 + U_2^2 - C_1^2 = -2 \cdot C_1 \cdot X_{10}$$

$$X_{10} = \frac{U_1^2 - U_2^2 + C_1^2}{2 \cdot C_1}$$

As a next step equation (5) is substituted into equation (4). Thus, $Y_{10}$ results in:

$$Y_{10} = \sqrt{U_2^2 - \left(C_1 - \frac{U_1^2 - U_2^2 + C_1^2}{2 \cdot C_1}\right)^2} \tag{6}$$

As a next step $\Delta X_1$ und $\Delta Y_1$ can be calculated using angle functions and the result from equation (6):

$$\alpha = \arcsin\left(\frac{|Y_{10}|}{U_1}\right) - 45° \tag{1}$$

$$\frac{\Delta X_1}{U_1} = \sin(\alpha)$$

$$\Delta X_1 = U_1 \cdot \sin\left(\arcsin\left(\frac{|Y_{10}|}{U_1}\right) - 45°\right)$$

$$\alpha = \arcsin\left(\frac{|Y_{10}|}{U_2}\right) - 45° \tag{2}$$

$$\frac{\Delta Y_1}{U_2} = \sin(\alpha)$$

$$\Delta Y_1 = U_2 \cdot \sin\left(\arcsin\left(\frac{|Y_{10}|}{U_2}\right) - 45°\right)$$

In analogy to equations (7) and (8), $\Delta X_2$ und $\Delta Y_2$ are determined for the opposite side, i.e. the other sensor pair.

Figure 9:
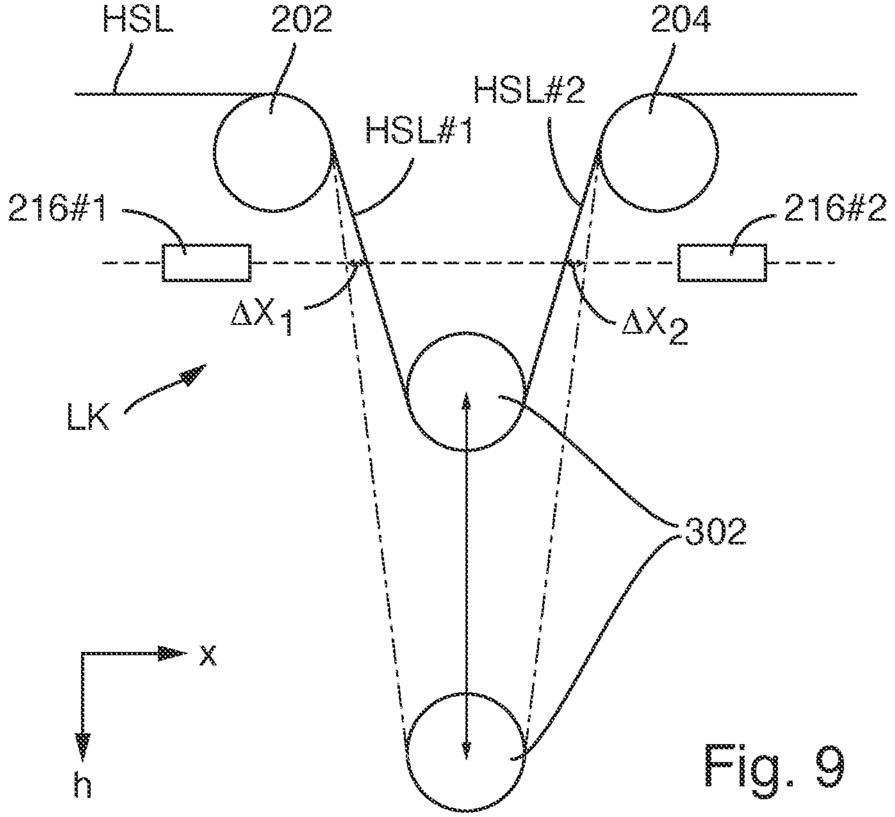
FIG. 9 depicts the trolley and various positions of a deflection pulley of a load receiving means.

FIG. 9 illustrates how the movement of the load receiving means in the h-direction causes an additional deflection $\Delta X_1$ and accordingly $\Delta X_2$ of the hoisting cable HSL in the x-direction, depending on the position of the load receiving means relative to the deflection pulleys 202, 204 of the trolley LK. Although this movement is calculated metrologically, it is possible, depending on the configuration, that the cable leaves the detection range of the sensors from a certain proximity of the load receiving means to the deflection pulleys 202, 204 due to this movement. In particular, when using the load receiving means with only one deflection pulley 302, the cable angle changes very strongly. This would cause the hoisting cable HSL to move out of the sensing range of the sensors 214 #1 and 214 #2 shown in FIG. 7. In order to extend the sensing range in the x-direction to compensate for the deflection of the cable due to the lifting and lowering of the load receiving means, the sensors 214, 216 can be arranged in pairs in a V-shape with respect to FIG. 7.

Figure 10:
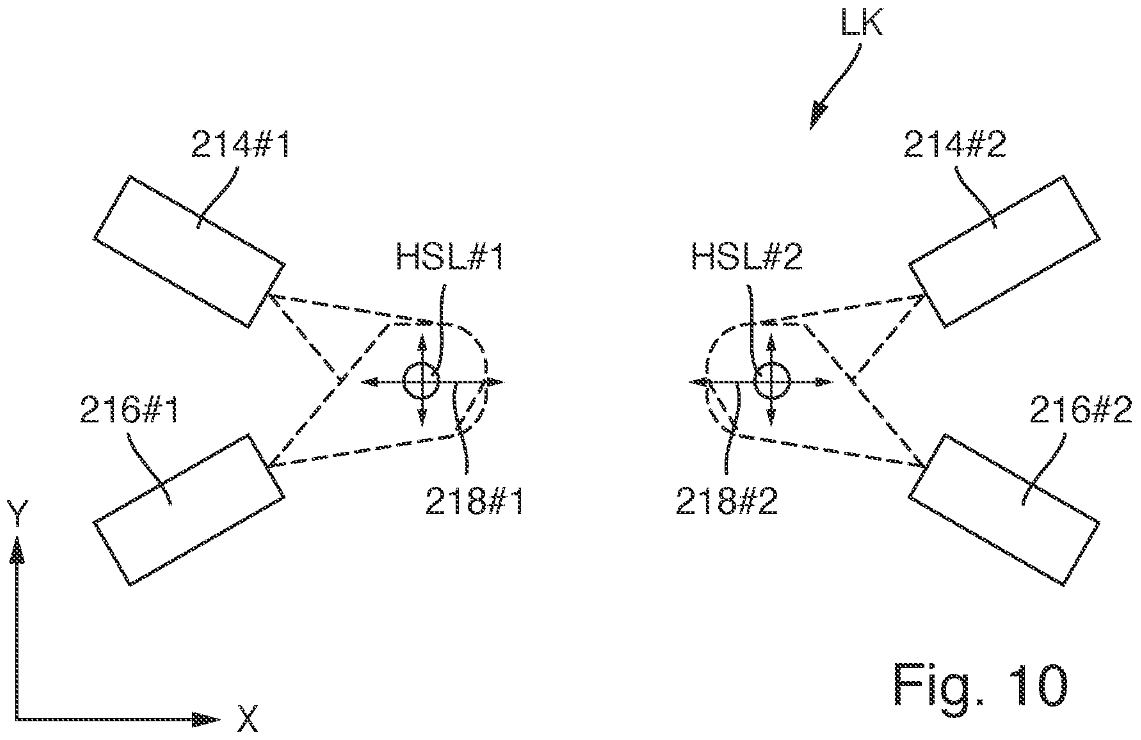

FIG. 10 depicts the aforementioned V-shaped arrangement of sensors 214 #1 and 216 #1 and accordingly 214 #2 and 216 #2 of the sensor device of trolley LK. The other features of the trolley LK can be seen in FIGS. 1 and 7. The V-shaped arrangement results in a larger measuring range 218 #1, 218 #2 in the x-direction, while the measuring range in the y-direction does not change significantly.

In the example shown, the sections HSL #1 and HSL #2 of the hoisting cable are located between the sensors 214, 216. In an alternative example which is not shown, the sensors 214, 216 are located at least partially, in particular entirely, between the sections HSL #1 and HSL #2 of the hoisting cable.

Figure 11:
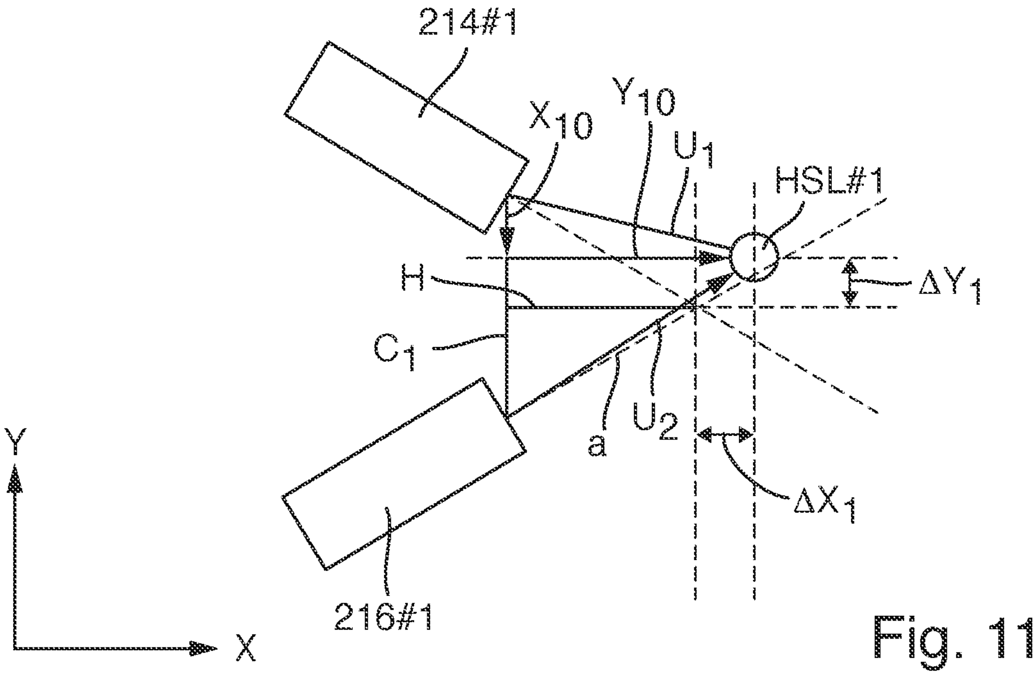

FIG. 11 illustrates the calculation rules for determining the position of the respective section HSL #1 or HSL #2 of the hoisting cable HSL using the example of the arrangement of FIG. 10.

The angles are calculated according to equations (9) and (10):

$$U_1^2 = X_{10}^2 + Y_{10}^2 \quad (9)$$

$$U_2^2 = X_{10}^2 + (C_1 - Y_{10})^2 \quad (10)$$

Equations (9) and (10) solved for $Y_{10}^2$ and $X_{10}^2$ results in:

$$Y_{10}^2 = U_1^2 - X_{10}^2 \quad (11)$$

$$X_{10}^2 = U_2^2 - (C_1 - Y_{10})^2 \quad (12)$$

Substituting equation (11) into equation (12) such that Y_10 results in:

$$Y_{10}^2 = U_1^2 - \left(U_2^2 - (C_1 - Y_{10})^2\right)$$

$$Y_{10}^2 = U_1^2 - U_2^2 + (C_1 - Y_{10})^2$$

$$Y_{10}^2 = U_1^2 - U_2^2 + C_1^2 - 2 \cdot C_1 \cdot Y_{10} + Y_{10}^2$$

$$0 = U_1^2 - U_2^2 + C_1^2 - 2 \cdot C_1 \cdot Y_{10}$$

Resolved to $Y_{10}$ results in:

$$Y_{10} = \frac{U_1^2 - U_2^2 + C_1^2}{2 \cdot C_1} \quad (13)$$

The calculated quantity $Y_{10}$ is substituted into equation (12) in order to calculate $X_{10}$:

$$X_{10} = \sqrt{U_2^2 - (C_1 - Y_{10})^2} \quad (14)$$

$$\Delta Y_1 = \frac{C_1}{2} - Y_{10}$$

To be able to calculate $\Delta X_1$, the height H of the associated isosceles triangle is calculated.

$$H^2 = a^2 + \left(\frac{C_1}{2}\right)^2 \quad (1)$$

$$H = \sqrt{a^2 + \left(\frac{C_1}{2}\right)^2} \quad (2)$$

Therefore, $\Delta X_1$ results in:

$$\Delta X_1 = X_{10} - H = X_{10} - \sqrt{a^2 + \left(\frac{C_1}{2}\right)^2} \quad (17)$$

In analogy to equations (14) and (17), $\Delta X_2$ and $\Delta Y_2$ are calculated for the opposite section of the hoisting cable.

Figure 12:
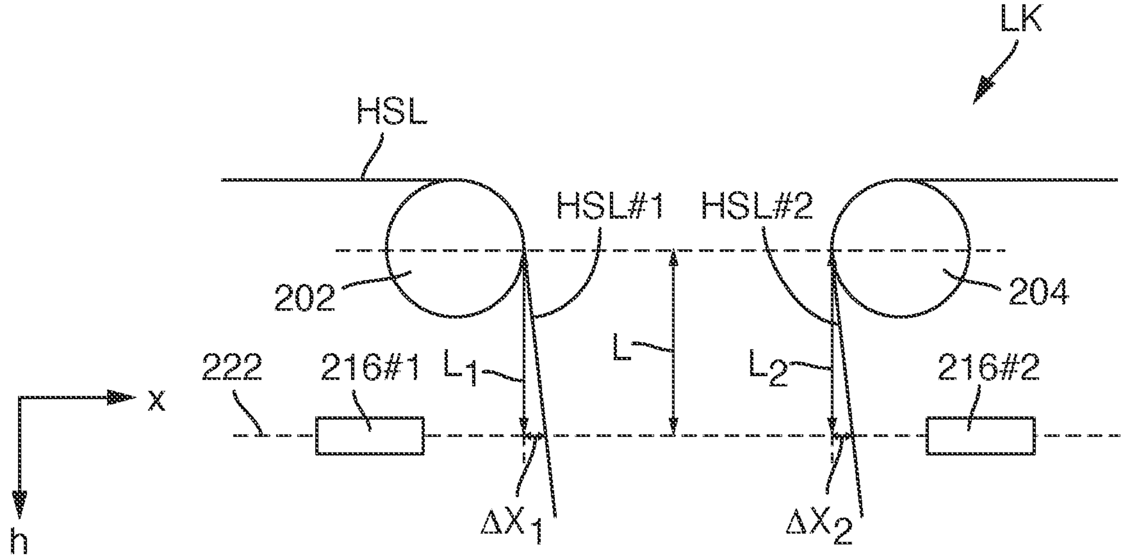
FIG. 12 depicts the trolley and parts of a sensor device.

FIG. 12 illustrates that different lengths $L_1$ and $L_2$ of the sections HSL #1, HSL #2 of the hoisting cable up to a sensor axis 222 result from the unwinding behavior of the hoisting cable over the deflection pulleys 202, 204. This is compensated for by equation (18). The average cable length L thus remains constant.

$$L = \frac{L_1 + L_2}{2} \quad (18)$$

The distances $\Delta X_1$ and $\Delta Y_1$ or $\Delta X_2$ and $\Delta Y_2$ determined by means of equations (7) and (8) or (14) and (17) are now converted into angles by means of the known and constant cable length from (18) up to the deflection pulley 202, 204.

The non-compensated angle φ_ux according to equation (19) describes the deflection of the load in relation to the trolley in the x-direction. Due to the inclination of the trolley LK, there is a deviation from the absolute angle of the sections HSL #1, HSL #2 of the hoisting cable in relation to the perpendicular through the trolley LK. The therefore uncompensated angle $\varphi_{ux}$ is therefore compensated for.

$$\varphi_{ux} = \frac{\arctan\left(\frac{\Delta X_1}{L}\right) + \arctan\left(\frac{\Delta X_2}{L}\right)}{2} \quad (19)$$

In analogy, the angle $\varphi_{1y}$ is determined according to equation (20). In analogy to the angle $\varphi_{ux}$, this describes the deflection of the load in the y-direction. However, compensation is not necessary in this case.

$$\varphi_{1y} = \frac{\arctan\left(\frac{\Delta Y_1}{L}\right) + \arctan\left(\frac{\Delta Y_2}{L}\right)}{2} \quad (20)$$

Figure 13:
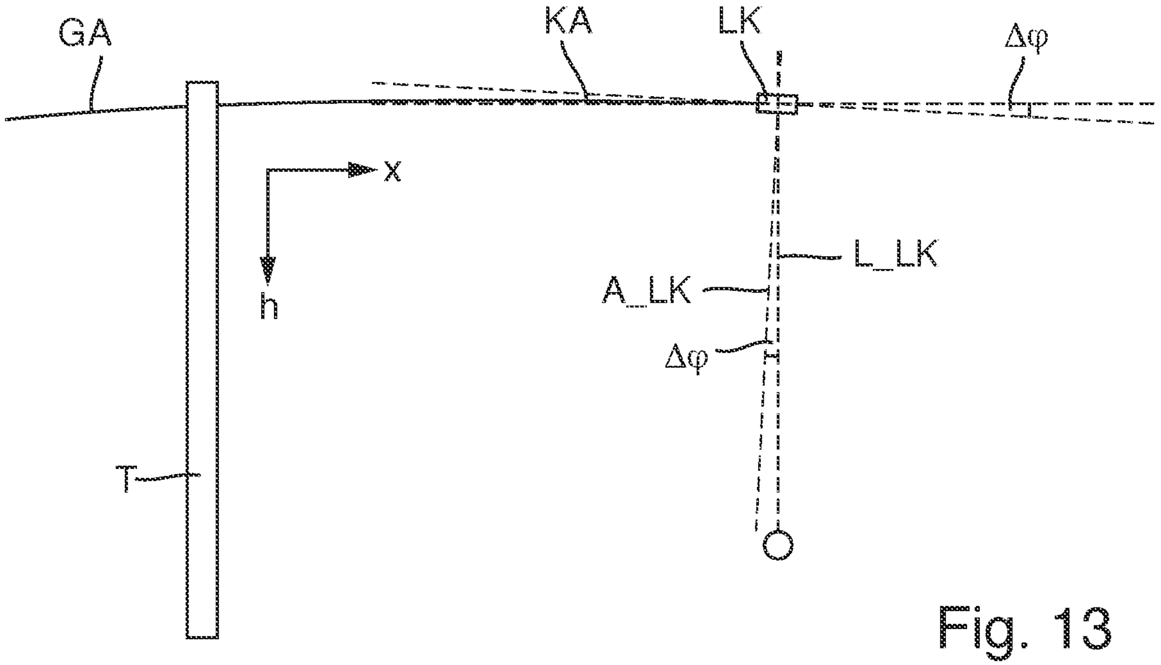
FIG. 13 depicts an angle of inclination of the trolley with respect to a horizontal generated by bending the trolley boom.

FIG. 13 illustrates the compensation of the angle $\varphi_{ux}$, for which the angle of inclination of the trolley is used. The angle of inclination Δφ caused by the bending of the trolley boom KA during load movements is determined by sensors on the trolley LK. This angle of inclination Δφ measures the absolute angle of the trolley LK to the horizontal in the imaginary hx-plane, which is spanned by the tower T and the trolley boom KA. Between a perpendicular L_LK through the center of the trolley and an axis A_LK which is perpendicular to the current travel axis of the trolley LK, the angle of inclination Δφ results.

With the determined angle of inclination Δφ, the angle $\varphi_{ux}$ can now be compensated for render $\varphi_{1x}$:

$$\varphi_{1x} = \varphi_{ux} - \Delta\varphi \quad (21)$$

Thus, the two deflection angles or cable angles $\varphi_{1x}$ and $\varphi_{1y}$ are detected by means of equations (20) and (21).

The measured deflection angles coming from the different sensor devices 210 and 310 of FIG. 1 are weighted by the factors $k_x$: ($0 \le k_1 \le 1$) und $k_y$: ($0 \le k_y \le 1$). In doing so, the aforementioned factors weight the influence of the respective angle on the result of the sensor fusion. The respective factor is adjusted depending on the pendulum length l in order to minimize unwanted oscillations of the sensor data in extreme ranges. The sensor data of the sensor device on the trolley are superimposed by the natural oscillation of the cable sections of the hoisting cable for long cable lengths (>50 m). The sensor data of the sensor device on the load receiving means, on the other hand, are superimposed by the natural oscillation for small cable lengths (<10 m) due to the pronounced rocking of the bottom flanges—especially when the hook is empty. Accordingly, the pendulum angles, which correspond to a virtual cable angle up to the virtual load (see FIGS. 2 and 3), are determined according to equations (22) and (23):

$$\varphi_x = k_x\varphi_{1x} + (1 - k_x)\varphi_{2x} \quad (22)$$

$$\varphi_y = k_y\varphi_{1y} + (1 - k_y)\varphi_{2y} \quad (23)$$

The pendulum length l results to upon the fixable length $l_K$:

$$l = l_1 + l_K \quad (24)$$

The fusion of the individual sensor data carried out in equations (22) and (23) reduces or eliminates unwanted out-of-phase vibrations.

The vibrations caused by the load receiving means are detected on the trolley and the load receiving means, which are each out of phase, and are advantageously eliminated by the addition in equations (22) and (23). This is important because it often happens that the two end points of the double pendulum (in this case the trolley and the load) do not move, wherein only the middle part of the double pendulum (in this case the lower flanges or the load receiving means) still oscillates.

The pendulum angles $\varphi_x$ and $\varphi_y$ recorded in this way are used as process variables in the regulation described. The virtual length or pendulum length l is added to the model of the crane as a parameter. In other words, the load position determined by the aforementioned parameters is introduced into the regulation system as process parameters.

By the detecting of the deflection of the section KSL #1 of the trolley cable connected to the trolley in relation to the longitudinal axis A_KA of the trolley boom KA, the angle of rotation θ of the trolley LK about the vertical axis H of the tower T in the xy-plane is determined.

Figure 14:
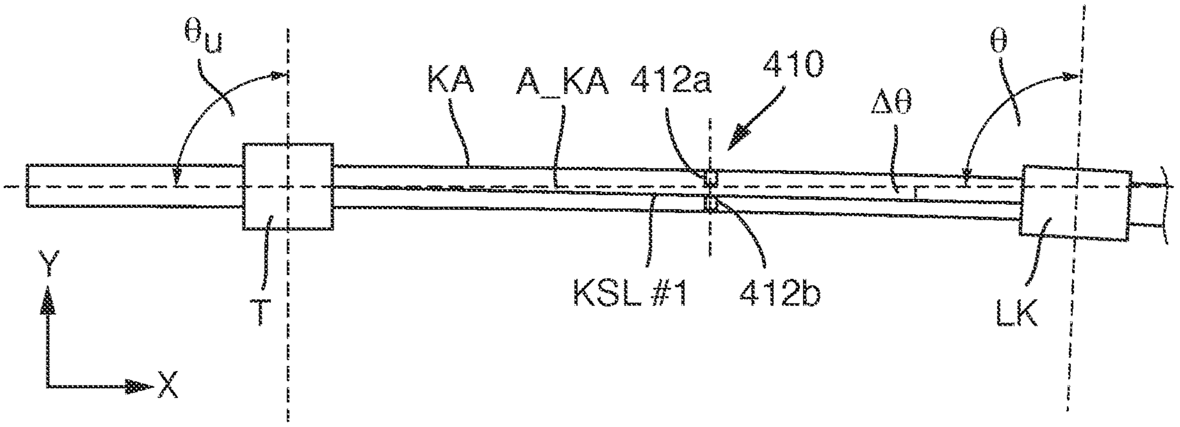
FIG. 14 depicts a difference in angle of rotation between an angle of rotation of the trolley and an angle of rotation of the trolley arm generated by bending the trolley arm.

FIG. 14 depicts how the elastic movement of the trolley boom KA results in a difference between the angle of rotation θ of the trolley LK, and thus the load relative to the longitudinal axis A_KA of the trolley boom KA compared to the angle of rotation $\theta_u$ of the tower T relative to the trolley boom KA.

According to FIG. 14, the sensor device 410 for the determination of a difference in the angle of rotation Δθ comprises two sensors 412*a* and 412*b*, which are arranged stationary relative to the trolley boom in the imaginary plane xy, and between which the section KSL #1 of the trolley cable is located. The sensors 412*a* and 412*b* determine the respective distance to the section KSL #1 of the trolley cable. By knowing the distance between the sensor device 410 and the vertical axis of the tower, the rotational angle difference Δθ can be determined. For example, the sensors 412*a* and 412*b* are ultrasonic sensors, LiDAR sensors or other sensors for measuring the distance between the sensors 412*a*, 412*b* and the section KSL #1 of the trolley cable.

Alternatively, it is conceivable to determine the difference in the angle of rotation Δθ by using additional sensors such as an electronic compass, GPS or other geometric measurement methods, etc.

Consequently, the angle of rotation θ of the trolley LK and thus of the load to the longitudinal axis A_KA of the trolley boom KA results in:

$$\theta = \theta_u + \Delta\theta \quad (24)$$

In addition to the control system shown in FIG. 4*a*, a state-space representation is discussed in general terms below. In the state-space representation, linear systems of $n_{th}$ order are decomposed into n subsystems of first order in order to give a clear picture of the mathematical description and the design of the state regulator. The trolley, for example, is a multi-variable system with four state variables, as it has just as many essential memory functions. Two of these state variables each relate to the trolley and to the multiple pendulum, which comprises hoisting cable, load receiving means, attaching means and load. Both systems considered individually represent a twofold integrating line. They are coupled with each other because a movement of the trolley always results in a movement of the multiple pendulum. The reaction of the movements of the multiple pendulum will be neglected here, since the frequency converter regulates the speed of the trolley, and thus prevents the retroaction on the trolley.

The regulator design builds on a mathematical description obtained from the multivariable system through system analysis. The differential equations are put into matrix and vector form, and can be transformed by matrix operations. The eigenvalues of the system are obtained, by which eigenvalues the instability of the system can be recognized in this case. When using the method of pole specification, a desired system is created—based on new, chosen eigenvalues—which has a stable behavior and desired dynamics. The difference between the real, unstable system and the desired system is then applied by the state regulator with the help of the calculated regulator coefficients.

The function of the state regulator is to calculate the actuating variable from the state variables and the target value. To do this, the state variables are multiplied by constant regulator factors, and the target value is multiplied by the pre-filter value. The sum of these products is then the wanted actuating variable. Basically, one could speak of four superimposed P-regulators. This immediately shows that the state regulator has no I or D components. The latter are only present insofar as a state variable can be the differential of another state variable. Thus, D components are fed into the regulation again.

FIG. 15 depicts a signal flow diagram which refers to the trolley and which results from the following equation (29). A speed u_LK of the trolley corresponds to a variable at the regulator output, and reacts to an abrupt change in the variable with a PT1 behavior. First, the linearized fourth-order process model is described. The four state variables are defined as follows:

x LK-position x'=v LK-velocity $\varphi_x$ pendulum angle $\varphi_x'$ pendulum angular velocity: φ_x' can be obtained either with an observer or by numerical derivation:

$$\varphi'_{x_k} = \frac{(\varphi_{x_k} - \varphi_{x_{k-1}})}{T_a}$$

$T_\alpha$ Sampling time.

The following process values are required to replicate the process and design the state regulator:

$T_{stell}$ time constant of the PT1 element that regulates the actuator (frequency converter+gear motor+mass inertias);

l Pendulum length as the distance to the load center of gravity S.

As already mentioned, the transition function of the speed can be approximated with that of a PT1 element. Thus, the transition function of the trolley speed results in:

$$x' = u_{LK} \cdot K \cdot \left(1 - e^{-\frac{t}{T}}\right) \tag{26}$$

K and T are parameters of the PT1 element, and will be determined below. The derivative of equation (26) results in the LK acceleration:

$$x'' = u_{LK} \cdot \frac{K}{T} \cdot e^{-\frac{t}{T}} \tag{27}$$

Equation (27) is solved for $$e^{-\frac{t}{T}},$$

and applying to equation (26) results in:

$$T \cdot x'' + x' = K \cdot u_{LK} \tag{28}$$

$$x'' = \frac{K}{T} \cdot u_{LK} - \frac{1}{T} \cdot x' \tag{29}$$

Figure 16:
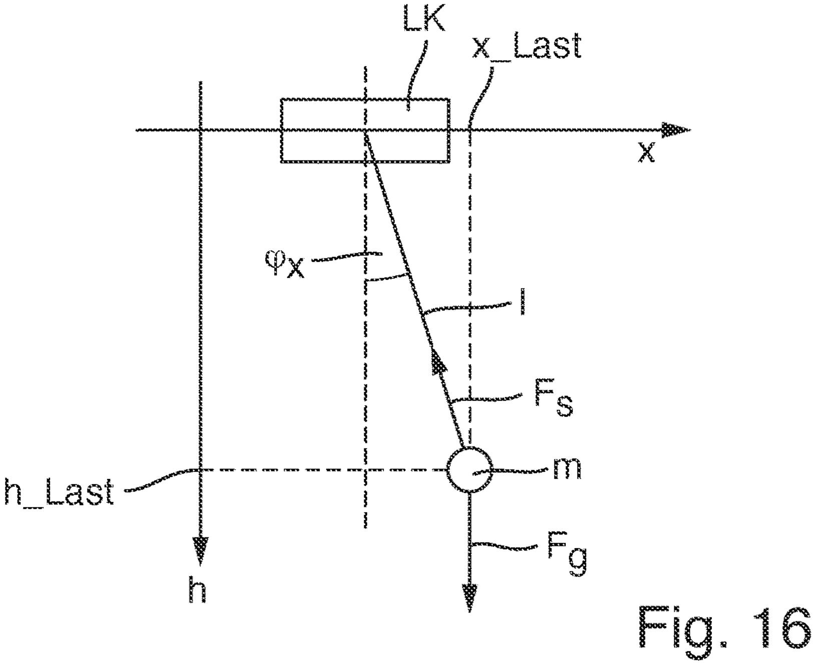

FIG. 16 is used to examine the motion of the pendulum system. Two forces act on the suspended multiple pendulum (see FIGS. 2 and 3 of the previous description): the downward weight force $F_9$ and the cable force $F_s$. The latter transmits the movements of the trolley LK to the load with the mass m at the virtual center of gravity of the multiple pendulum.

This results in balances of the horizontal and vertical forces, the sums of which, according to Newton's equilibrium of forces, each give the value of zero. New auxiliary variables are:

x_Last horizontal position of the virtual center of gravity of the load or multiple pendulum; and h_Last vertical position of the virtual center of gravity of the load or multiple pendulum.

The horizontal forces and vertical forces are obtained according to equations (30) and (31):

$$m \cdot \text{x\_Last}'' + F_s \cdot \sin(\varphi_x) = 0 \tag{30}$$

$$-m \cdot g + m \cdot \text{h\_Last}'' + F_s \cdot \cos(\varphi_x) = 0 \tag{31}$$

With respect to the state equations containing only x, x', $\varphi_x$ and $\varphi_x$', all other variables ($F_s$, x_Last and h_Last) must be eliminated. Extending equation (30) by using $\cos(\varphi_x)$ and equation (31) by using $\sin(\varphi_x)$, one obtains:

$$m \cdot \text{x\_Last}'' \cdot \cos(\varphi_x) + F_s \cdot \sin(\varphi_x) \cdot \cos(\varphi_x) = 0 \tag{32}$$

-continued $$-m \cdot g \cdot \sin(\varphi_x) + m \cdot \text{h\_Last}'' \cdot \sin(\varphi_x) + F_s \cdot \cos(\varphi_x) \cdot \sin(\varphi_x) = 0 \tag{33}$$

Subtracting (32) from (33) removes the bar force $F_s$. The result is then divided by the load mass m, thereby removing m as well:

$$\text{x\_Last}'' \cdot \cos(\varphi_x) - \text{h\_Last}'' \cdot \sin(\varphi_x) = -g \cdot \sin(\varphi_x) \tag{34}$$

The coordinates of the load (x_Last and h_Last) are eliminated using the transformation equations:

$$\text{x\_Last} = x + l \cdot \sin(\varphi_x) \tag{35}$$

$$\text{h\_Last} = l \cdot \cos(\varphi_x) \tag{36}$$

Since the variables x_Last und h_Last appear in their second derivative in (34), they must be derived twice:

$$\text{x\_Last}' = x' + l \cdot \varphi_x' \cdot \cos(\varphi_x) \tag{37}$$

$$\text{h\_Last}' = -l \cdot \varphi_x' \cdot \sin(\varphi_x)$$

$$\text{x\_Last}'' = x'' + l \cdot \varphi_x'' \cdot \cos(\phi) - l \cdot \varphi_x'^2 \cdot \sin(\varphi_x) \tag{38}$$

$$\text{h\_Last}'' = -l \cdot \varphi_x'' \cdot \sin(\phi) - l \cdot \varphi_x'^2 \cdot \cos(\varphi_x)$$

The equations for x_Last" and h_Last" (38) are inserted into equation (39). This results in the non-linear differential equation of the pendulum system:

$$x'' \cdot \cos(\varphi_x) + l \cdot \varphi_x'' = -g \cdot \sin(\varphi_x) \tag{39}$$

In order to linearize this differential equation, the pendulum angle Tp, is assumed to be very small:

$$\varphi_x \ll 1 \Rightarrow \sin(\varphi_x) \approx \varphi_x \tag{40}$$

and $$\cos(\varphi_{xz)} \approx 1$$

and $$\varphi_x'^2 \approx 0$$

$$x'' + l \cdot \varphi_x'' = -g \cdot \varphi_x$$

The linearized differential equation (40) is solved for $\varphi_x$" (41), and is represented as a signal flow diagram in FIG. 17.

$$\varphi_x'' = -\frac{g}{l} \cdot \varphi_x - \frac{1}{l} \cdot x'' \tag{41}$$

x" in the time equation for the pendulum system according to equation (41) can be replaced by the time equation (29) for the trolley. This allows the signal flow diagrams shown above to be linked. The equation (29) inserted into (41) results in:

$$\varphi_x'' = -\frac{g}{l}\cdot\varphi_x - \frac{K}{T\cdot l}\cdot \text{x\_Last} + \frac{1}{T\cdot l}\cdot x' \quad (42)$$

In order to describe the system in the state space, the linear differential equations are converted into state equations. For this, the variables x, x', $\varphi_x$ und $\varphi_x'$ are replaced by the state variables q=[q0, q1, q2, q3]:

$$x'' = \frac{K}{T}\cdot u_{LK} - \frac{1}{T}\cdot x' \quad (43)$$

$$\varphi_x'' = -\frac{g}{l}\cdot\varphi_x - \frac{K}{T\cdot l}\cdot u_{LK} + \frac{1}{T\cdot l}\cdot x' \quad (44)$$

Vectors and matrices are introduced for the clearer short form. The vector differential equation for state variables is obtained:

$$\begin{bmatrix} x' \\ x'' \\ \varphi_x' \\ \varphi_x'' \end{bmatrix} = \begin{bmatrix} 0 & 1 & 0 & 0 \\ 0 & -\frac{1}{T} & 0 & 0 \\ 0 & 0 & 0 & 1 \\ 0 & \frac{1}{l\cdot T} & -\frac{g}{l} & 0 \end{bmatrix} \cdot \begin{bmatrix} x \\ x' \\ \varphi_x \\ \varphi_x' \end{bmatrix} + \begin{bmatrix} 0 \\ \frac{K}{T} \\ 0 \\ -\frac{K}{l\cdot T} \end{bmatrix} \cdot u_{LK} \quad (45)$$

The regulator receives as target value the desired speed of the trolley in the range from −100 to 100% of nominal speed with an accuracy of $$\Delta V = \frac{100\%}{20000} = 0.005\% = 8.3\ \frac{\text{mm}}{\text{s}}$$

and regulates the speed of the trolley without amplification, from which follows $K=K_{stg}=1$. The actual speed follows the target value with a delay time of $T=T_{stg}=0.2$ s.

In order to enable a pendulum-free positioning, a state regulator is used to convert the undamped real system into a sufficiently damped desired system. To do this, numbers are first inserted into the input and system matrix: $T=T_{stg}=0.2$ s; $K=K_{stg}=1$; l: variable.

$$A_{LK} = \begin{bmatrix} 0 & 1 & 0 & 0 \\ 0 & -5 & 0 & 0 \\ 0 & 0 & 0 & 1 \\ 0 & \frac{5}{l} & -\frac{9.81}{l} & 0 \end{bmatrix} \quad (46)$$

$$B_{LK} = \begin{bmatrix} 0 \\ 5 \\ 0 \\ -\frac{5}{l} \end{bmatrix}$$

Upon the assistance regulation, the speed of the LK is the controlled variable. The regulator therefore ensures that the LK follows the speed specification as smoothly as possible. In this case, the position of the trolley is of no interest, wherein the state space representation can be reduced to this state variable. The new matrix representation is:

$$A_{LK} = \begin{bmatrix} -5 & 0 & 0 \\ 0 & 0 & 1 \\ \frac{5}{l} & -\frac{9.81}{l} & 0 \end{bmatrix} \quad (47)$$

$$B_{LK} = \begin{bmatrix} 5 \\ 0 \\ -\frac{5}{l} \end{bmatrix}$$

In order to be able to design a regulator, a cable length according to the pendulum length l is assumed: e.g. for l=5 m the following matrix representation results:

$$A_{LK} = \begin{bmatrix} -5 & 0 & 0 \\ 0 & 0 & 1 \\ 1 & -1.962 & 0 \end{bmatrix} \quad (48)$$

$$B_{LK} = \begin{bmatrix} 5 \\ 0 \\ -1 \end{bmatrix}$$

The eigenvalues describing the system are obtained by finding the zero position of the characteristic polynomial:

$$\det(\Lambda\cdot I - A) = 0 \quad (49)$$

Alternatively, a simulation tool is being used:

$$eig(A) = [\ 1.4007i \ \ -1.4007i \ \ -2.5\ ] \quad (50)$$

With respect to the first and second imaginary solutions it can be seen that the real system is an undamped oscillatory system, since real part first 2 poles is 0.

For the digital control, a discrete representation is required, which can be obtained, for example, in Matlab with the following command:

$$[Ad, Bd, Cd, Dd] = c2d(A, B, C, D, T_a); \quad (51)$$

For $T_\alpha$=0.1 s:

$$Ad = \begin{bmatrix} 0.7788 & 0 & 0 \\ 0.0023 & 0.9902 & 0.0997 \\ 0.0441 & -0.1956 & 0.9902 \end{bmatrix} \quad (52)$$

$$Bd = \begin{bmatrix} 0.2212 \\ -0.0023 \\ -0.0441 \end{bmatrix}$$

The eigenvalues for discrete representation result in:

$$EWd = eig(Ad) = \begin{bmatrix} 0.9902 + 0.1396i \\ 0.9902 - 0.1396i \\ 0.7788 \end{bmatrix} \quad (53)$$

$$\text{abs}(EWd) = \begin{bmatrix} 1 \\ 1 \\ 0.7788 \end{bmatrix} \quad (54)$$

First and second complex poles lie on the unit circle, which also points to an oscillatory system. In order to arrive at the pendulum-free desired system, the latter is defined by the specification of its eigenvalues. The poles of the system are therefore specified (pole specification). The poles are placed in such a way that the available acceleration moment is not exceeded. The closer the poles are chosen to be at the center of the unit circle, the more dynamic the desired system becomes, and the greater the maximum deflection angle during the acceleration phase becomes, which has a negative effect on the steel structure. An optimum is therefore determined in the sense of a compromise, taking both aspects into account. If the cable length or pendulum length l changes, eigenvalues and the resulting regulator are also recalculated or updated.

As an alternative to pole presetting, a Riccati regulator (LQ regulator) can also be used. This is a state regulator for a linear dynamic system whose feedback matrix is determined by minimizing a quadratic cost function. This enables an optimal regulator design for given state weights Q.

Figure 19:
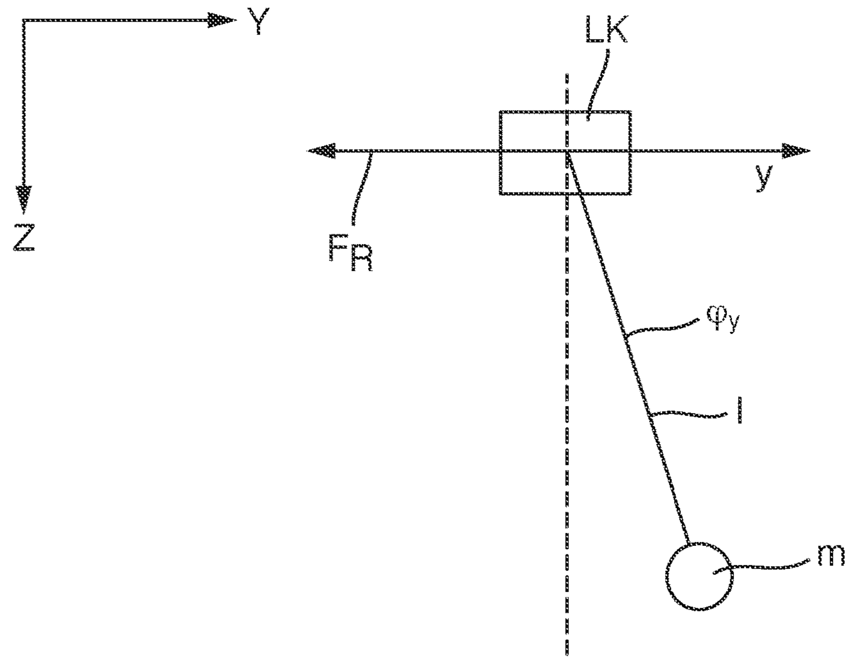

A system analysis of the rotating mechanism is carried out on the basis of FIGS. 18 and 19. The four state variables of the rotating mechanism are defined as follows:

- θ DW angle
- θ' DW angular velocity
- $\varphi_y$ pendulum angle
- $\varphi_y$' pendulum angular velocity, which is obtained either by observation or by numerical derivation.

The rotary motion of the trolley boom KA can be described by the following equation:

$$I_A \cdot \theta'' = M - M_R, \quad (55)$$

wherein the following variables are used:

- $I_A$ moment of inertia acting on rotating mechanism;
- M driving torque of the rotating mechanism;
- $M_R$ counter-torque;

$$M_R = F_R \cdot x \quad (56)$$
$$M_R = m \cdot y_L'' \cdot x$$
$$F_R = \sin(\varphi_y) \cdot m \cdot g$$
$$I_A \cdot \theta'' = M - \sin(\varphi_y) \cdot m \cdot g \cdot x$$

The equations of motion for the load result in:

$$m \cdot y_L'' = y - m \cdot g \quad (57)$$
$$m \cdot z_L'' = F_R$$

The equations of motion for the load in the Y-direction result in:

$$y_L = y + l \cdot \sin(\varphi_y) \quad (58)$$
$$y_L' = y' + l \cdot \cos(\varphi_y) \cdot \varphi_y'$$
$$y_L'' = y'' - l \cdot \sin(\varphi_y) \cdot \varphi_y'^2 + l \cdot \cos(\varphi_y) \cdot \varphi_y''$$

The equations of motion for the load in the Z-direction result in:

$$z_L = l - l \cdot \cos(\varphi_y) \quad (59)$$
$$z_L' = l \cdot \sin(\varphi_y) \cdot \varphi_y'$$
$$z_L'' = l \cdot \cos(\varphi_y) \cdot \phi_y'^2 + l \cdot \sin(\varphi_y) \cdot \varphi''$$

The equations (55) and (56) together result in:

$$I_A \cdot \theta'' = M - m \cdot x \cdot y_L'' \quad (60)$$

Substituting equation (58) into (60) results in:

$$I_A \cdot \theta'' = M - m \cdot x \cdot \left(y'' - l \cdot \sin(\varphi_y) \cdot \varphi_y'^2 + l \cdot \cos(\varphi_y) \cdot \varphi_y''\right) \quad (61)$$
$$\frac{I_A}{m \cdot x} \cdot \theta'' = \frac{M}{m \cdot x} - y'' + l \cdot \sin(\varphi_y) \cdot \phi_y'^2 - l \cdot \cos(\varphi_y) \cdot \phi_y''$$

In order to obtain the 1$^{st}$ differential equation, the conversions from y" to θ" are performed:

$$y \approx x \cdot \theta$$
$$y' \approx x \cdot \theta'$$
$$y'' \approx x \cdot \theta''$$

Substitution of the angle of rotation θ in radians into y" results in:

$$\frac{I_A}{m \cdot x} . \theta'' = \frac{M}{m \cdot x} - x \cdot \theta'' + l \cdot \sin(\varphi_y) \cdot \phi_y'^2 - l \cdot \cos(\varphi_y) \cdot \varphi_y'' \quad (62)$$
$$\frac{I_A}{m \cdot x} . \theta'' + x \cdot \theta'' = \frac{M}{m \cdot x} + l \cdot \sin(\varphi_y) \cdot \varphi_y'^2 - l \cdot \cos(\varphi_y) \cdot \varphi_y''$$
$$\left(\frac{I_A}{m \cdot x} + s\right) \cdot \theta'' = \frac{M}{m \cdot x} + l \cdot \sin(\varphi_y) \cdot \varphi_y'^2 - l \cdot \cos(\varphi_y) \cdot \varphi_y'' \text{ 1st } DE$$

The differential equation (64) is identical to the differential equation (39) from the modelling of the trolley:

$$x'' \cdot \cos(\varphi_x) + l \cdot \varphi_x'' = -g \cdot \sin(\varphi_x) \text{ 2. } DE \text{ of the trolley} \quad (1)$$
$$l \cdot \varphi_x'' = -x'' \cdot \cos(\varphi_x) - g \cdot \sin(\varphi_x)$$

Upon adaptation to the rotating mechanism, this results in:

$$\varphi_x \to \varphi_y$$
$$x'' \to y'' = x \cdot \theta''$$

This results in the 2$^{nd}$ differential equation:

$$l \cdot \varphi_y'' = -x \cdot \theta'' \cdot \cos(\varphi_y) - g \cdot \sin(\varphi_y) \text{ 2nd } DE \quad (64)$$

In order to linearize the differential equations, the pendulum angle φ, is assumed to be very small:

$$\varphi_x \ll 1 => \sin(\varphi_x) \approx \varphi_x \text{ und } \cos(\varphi_x) \approx 1 \text{ und } \varphi_x'^2 \approx 0 \tag{65}$$

The process variable corresponds to the drive torque of the rotating mechanism (DW):

$$M = u_{DW} \tag{66}$$

$$\theta'' = \frac{m \cdot x \cdot g}{I_A} \cdot \varphi_y + \frac{1}{I_A} \cdot u_{DW} \text{ 1st } DE \tag{67}$$

$$\varphi_y'' = -\left(\frac{m \cdot x^2 \cdot g}{l \cdot I_A} + \frac{g}{l}\right) \cdot \varphi_y - \frac{x}{l \cdot I_A} \cdot u_{DW} \text{ 2nd } DE \tag{68}$$

In state space representation, this results in:

$$\begin{bmatrix} \theta' \\ \theta'' \\ \varphi_y' \\ \varphi_y'' \end{bmatrix} = \begin{bmatrix} 0 & 1 & 0 & 0 \\ 0 & \frac{m \cdot x \cdot g}{I_A} & 0 & 0 \\ 0 & 0 & 0 & 1 \\ 0 & -\left(\frac{m \cdot x^2 \cdot g}{l \cdot I_A} + \frac{g}{l}\right) & -\frac{g}{l} & 0 \end{bmatrix} \cdot \begin{bmatrix} \theta \\ \theta' \\ \varphi_y \\ \varphi_y' \end{bmatrix} + \begin{bmatrix} 0 \\ \frac{1}{I_A} \\ 0 \\ -\frac{x}{l \cdot I_A} \end{bmatrix} \cdot u_{DW} \tag{69}$$

$$A_{DW} = \begin{bmatrix} 0 & 1 & 0 & 0 \\ 0 & \frac{m \cdot x \cdot g}{I_A} & 0 & 0 \\ 0 & 0 & 0 & 1 \\ 0 & -\left(\frac{m \cdot x^2 \cdot g}{l \cdot I_A} + \frac{g}{l}\right) & -\frac{g}{l} & 0 \end{bmatrix} \tag{70}$$

$$B_{DW} = \begin{bmatrix} 0 \\ \frac{1}{I_A} \\ 0 \\ -\frac{x}{l \cdot I_A} \end{bmatrix} \tag{71}$$

The regulator design for the rotating mechanism (Y-direction) and the hoisting mechanism essentially follows the same principle. The result is a crane model in state space consisting of three states for the trolley model, four states for the rotating mechanism model and two states for the hoist model:

$$\text{States:} \vec{Z} = [\, x' \;\; \varphi_x \;\; \varphi_x' \;\; \theta \;\; \theta' \;\; \varphi_y \;\; \varphi_y' \;\; l \;\; l' \,]; \tag{1}$$

$$\begin{bmatrix} x'' \\ \varphi_x' \\ \varphi_x'' \\ \theta' \\ \theta'' \\ \varphi_y' \\ \varphi_y'' \\ l' \\ l'' \end{bmatrix} = \begin{bmatrix} & & & & & & & 0 & 0 \\ & A_{LK} & & & A_{DW} \to A_{LK} & & & 0 & 0 \\ 0 & 0 & 0 & & & & & 0 & 0 \\ 0 & 0 & 0 & & & & & 0 & 0 \\ 0 & 0 & 0 & & A_{DW} & & & 0 & 0 \\ 0 & 0 & 0 & & & & & 0 & 0 \\ 0 & 0 & 0 & 0 & 0 & 0 & 0 & A_{HW} & \\ 0 & 0 & 0 & 0 & 0 & 0 & 0 & & \end{bmatrix}$$

-continued $$\begin{bmatrix} x' \\ \varphi_x \\ \varphi_x' \\ \theta \\ \theta' \\ \varphi_y \\ \varphi_y' \\ l \\ l' \end{bmatrix} + \begin{bmatrix} & & 0 & 0 \\ B_{LK} & & 0 & 0 \\ & & 0 & 0 \\ 0 & & & 0 \\ 0 & & & 0 \\ 0 & B_{DW} & & 0 \\ 0 & & & 0 \\ 0 & 0 & B_{HW} & \\ 0 & 0 & & \end{bmatrix} \cdot \begin{bmatrix} u_{LK} \\ u_{DW} \\ u_{HW} \end{bmatrix}$$

The regulator uses, for example, the current position of the load in relation to the horizontal tower axes or the speeds of the load as process variable.

The respective target values $x'_{soll}$, $\theta_{soll}$, $l_{soll}$ that is $S_{soll}$ are integrated from the joystick inputs of the control unit. The speed $u_{LK}$, $u_{DW}$, $u_{HW}$ of the respective drive (trolley carriage, rotating mechanism and hoisting mechanism) is used as a preset in order to achieve both the target speed of the load or the target position of the load. The joystick preset can be done both step-based and as a percentage of the maximum speed. The following equations refer to the examples in FIGS. 5 and 6.

$$\overrightarrow{S_{soll}} = [\, x'_{soll} \;\; \theta_{soll} \;\; l_{soll} \,] \tag{73}$$

$$\vec{u} = [\, u_{LK} \;\; u_{DW} \;\; u_{HW} \,] \tag{74}$$

$$\vec{Z} = [\, x \;\; \varphi_x \;\; \theta \;\; \varphi_y \;\; l \;\; l' \,]; \tag{75}$$

$$\vec{\tilde{Z}} = [\, x' \;\; \varphi_x \;\; \tilde{\varphi}_x' \;\; \theta \;\; \theta' \;\; \varphi_y \;\; \tilde{\varphi}_y' \;\; l \;\; l' \,]; \tag{76}$$

In the regulation loop, the respective future movements of the measured variables x' $\varphi_x$ θ θ' $\varphi_y$ l are calculated using the crane model (72). On this basis, the process variable for the subsequent process loop is determined, and is provided to the crane as the target variable.

In contrast to a conventional process system that only allows damping of the oscillation, an optimal trajectory of the movement (based on neutralization of an upward oscillation leading to pendulum movement) of the load is calculated on the basis of the available (merged) sensor and model data, so that no strong pendulum movement caused by the crane operator or by the crane operation can occur.

A subsequent damping of the oscillating pendulum system is therefore not necessary, that is a process scope designed for this is very limited and can be managed effectively.

After activation of the regulation by target value provision, the regulator transitions into acceleration phase, during which not only pendulum movement caused by the initial movement, but also initial pendulum movement is eliminated. After that, as long as the target value (step) remains constant, the constant travel phase follows, where the load is moved at constant speed without pendulum movement. Each target value or step change in turn initiates an acceleration or braking phase.

The regulation is also activated after pulse-like actuation of the control panel. In this case, only the initial pendulum movement is regulated. The time for the regulation can be sensibly limited to a pendulum period. As is known, the pendulum period is only dependent on length and is calculated by using the following formula:

$$T = 2 \cdot \pi \cdot \sqrt{\frac{l}{g}} \quad (77)$$

FIG. 20 depicts in schematic form the control unit 100 which consists of a first computing unit 150 and a second computing unit 160. The first computing unit 150 is connected to the drives of the crane and provides safety functions such as emergency shutdowns and the like. For example, the computing unit 150 is designed as a programmable logic regulator, PLC.

The second computing unit 160 is communicatively coupled to the first computing unit 150. In step 162, the second computing unit 160 waits for a message from the first computing unit S_1, that is the second computing unit 160 waits for a control telegram from the PLC. The first computing unit 150 sends periodic messages including current control commands and sensor data to the second computing unit 160. If the message comprises target variables which are specified by the first computing unit 150, for example, by means of the joystick input from the control panel or the radio remote control, then a change starting from a step 164 to block 110 of FIG. 1 takes place, and the regulation is performed. In step 166, it is checked whether manual activation of the regulation has been requested. If this is the case, then the block 110 is being activated.

In a step 168, it is checked whether a readjustment has to be done. If, for example, there is no message from the first computing unit, it is checked whether actual variables or variables derived therefrom exceed a given threshold value. If this is the case, the block 110 is activated. The request for readjustment is determined, for example, when the angle of rotation θ of the trolley LK, the first pendulum angle or the second pendulum angle exceed a respectively assigned threshold value. Thus, a readjustment is performed when the movement of the load has not been completed after the absence of a control command. In order to prevent the load from swinging, a readjustment of the load is initiated.

Block 110 determines actuating variables, which are transferred to the first computing unit in a step 170 in order to be forwarded to the crane drives. The determination of the variables u_LK, u_DW, u_HW by means of block 110 is therefore activated when at least one of the following conditions occurs: presence 164 of the target variable S'_soll not equal to zero; presence 166 of a manual activation of the determination 110 of the actuating variable originating from a control unit 900; and presence 168 of a request for readjustment.

The invention claimed is:

1. A tower crane, comprising:

a tower having a vertical axis;

a trolley boom projecting from the tower;

a rotating mechanism for rotating at least the trolley boom about the vertical axis;

a sensor device for determining an angle of rotation of the trolley boom about the vertical axis;

a trolley which can travel along the trolley boom and has at least a first and a second deflection pulley for a hoisting cable;

a load receiving means having at least one deflection pulley for the hoisting cable;

a sensor device arranged on the load receiving means for determining at least a first deflection angle of the load receiving means with respect to the perpendicular running through the load receiving means;

the hoisting cable which, starting from a hoisting mechanism, is guided at least over the first deflection pulley of the trolley, the at least one deflection pulley of the load receiving means and the second deflection pulley of the trolley, and which is fastened to a distal section of the trolley boom;

the hoisting mechanism;

a sensor device arranged on the trolley for determining at least a second deflection angle of at least a section of the hoisting cable located between the trolley and the load receiving means with respect to the perpendicular passing through the trolley;

a trolley travelling winch connected by means of a trolley cable to the trolley for movement thereof along the trolley boom;

a sensor device for detecting a rotational angle difference between the rotational angle of the trolley boom about the vertical axis and the rotational angle of the trolley about the vertical axis; and a control unit which operates the rotating mechanism, the hoisting mechanism and the trolley travelling winch as a function of at least the angle of rotation, as a function of the at least one first angle of deflection, as a function of the at least one second angle of deflection and as a function of the difference in angle of rotation.

2. The tower crane according to claim 1, wherein the sensor device for determining the rotational angle difference is arranged fixedly relative to the trolley boom, in particular on the trolley boom or on a frame of the trolley travelling winch;

wherein a sensor signal generated by the sensor device for determining the angle of rotation difference represents a distance between the sensor device and a section of the trolley cable located between a pulley fixed proximal to the trolley boom and the trolley; and wherein the angle of rotation difference is determined by means of the control unit in dependence on the sensor signal representing the distance.

3. The tower crane according to claim 1, wherein the sensor device for determining the angle of rotation difference starting from the tower is arranged in a first or proximal half, in particular in the first or proximal third, of the length of the trolley boom.

4. The tower crane according to claim 1, wherein a sensor signal generated by the sensor device for determining the at least one second deflection angle represents a distance between the sensor device and the at least one section of the hoisting cable; and wherein the at least one second deflection angle is determined by the control unit in dependence on the sensor signal representing the distance.

5. The tower crane according to claim 1, comprising:

a further sensor device arranged on the trolley for determining at least one angle of inclination of the trolley to a horizontal; and wherein the control unit additionally operates the rotating mechanism, the hoisting mechanism and the trolley travelling winch in dependence on the at least one angle of inclination.

6. A method of operating a tower crane of claim 1, the method comprising:

determining the first deflection angle, lying in the first plane, of the load receiving means suspended from the trolley by means of the hoisting cable with respect to the perpendicular running through the load receiving means;

determining at least the second deflection angle of at least the section of the hoisting cable located between the trolley and the load receiving means with respect to the perpendicular passing through the trolly;

determining at least one angle of rotation of the trolley about the vertical axis of the tower; and determining at least one variable for operating the rotating mechanism, the hoisting mechanism and the trolley travelling winch, as a function of the at least one first deflection angle, as a function of the at least one second deflection angle and as a function of the at least one angle of rotation.

7. The method according to claim 6, comprising:

determining at least a first pendulum angle characterizing a deflection of a virtual center of gravity of a multiple pendulum suspended from the trolley with respect to a perpendicular passing through the trolley in a first spatial plane;

wherein the first pendulum angle is determined as a function of the second deflection angle, lying in the first plane, of the at least one section of the hoisting cable and as a function of the first deflection angle, lying in the first plane, of the load receiving means, wherein the at least one variable is determined as a function of the at least one first pendulum angle; and/or comprising:

determining a first weighting factor as a function of a pendulum length; and wherein the first pendulum angle is determined by weighting the in-plane second deflection angle of the section of the hoisting cable in dependence on the first weighting factor and by weighting the in-plane first deflection angle of the load receiving means in dependence on the first weighting factor.

8. The method according to claim 6, comprising:

determining an angle of inclination of the trolley with respect to the horizontal;

determining a compensated deflection angle lying in the first plane as a function of the inclination angle of the trolley and as a function of the second deflection angle lying in the first plane of the at least one section of the hoisting cable;

wherein the first pendulum angle is determined as a function of the compensated deflection angle, lying in the first plane, of the at least one section of the hoisting cable and as a function of the first deflection angle, lying in the first plane, of the load receiving means.

9. The method according to claim 6, comprising:

determining a deflection angle, lying in the second plane, of the at least one section of the hoisting cable located between the trolley and the load receiving means with respect to the perpendicular passing through the trolley;

determining a deflection angle, located in the second plane, of the load receiving means suspended from the trolley by means of the hoisting cable with respect to the perpendicular passing through the load receiving means; and wherein the second deflection angle is determined as a function of the deflection angle lying in the second plane and as a function of the deflection angle of the load receiving means lying in the second plane, and/or comprising:

determining a second weighting factor as a function of the pendulum length; and wherein the second deflection angle is determined by weighting the deflection angle of the at least one section of the hoisting cable lying in the second plane in dependence on the second weighting factor and by weighting the deflection angle of the load receiving means lying in the second plane in dependence on the second weighting factor.

10. The method according to claim 6, comprising:

determining a length of one of the sections of the hoisting cable between the trolley and the load receiving means; and determining the pendulum length as a function of the length of one of the sections of the hoisting cable and a predetermined length, which can in particular be predetermined manually during operation, of a load cable between the load receiving means and the load, and/or comprising:

determining an angle of rotation of the trolley boom about the vertical axis;

determining a rotational angle difference between the rotational angle of the trolley boom about the vertical axis and the rotational angle of the trolley about the vertical axis; and wherein the angle of rotation of the trolley about the vertical axis of the tower is determined as a function of the angle of rotation of the trolley boom and as a function of the difference in angle of rotation.

11. The method according to claim 6, wherein the determination of the at least one variable is activated if at least one of the following conditions occurs:

presence of at least one target value variable other than zero;

presence of a manual activation of the determination of the at least one variable originating from a control unit; and presence of a request for readjustment.

12. The method according to claim 6, comprising:

updating a model, in particular matrices characterizing the model, as a function of the pendulum length, a position of the trolley and as a function of mass associated with the multiple pendulum, determined in particular by means of a sensor device; and wherein the determination of the at least one variable is performed as a function of the updated model, and/or comprising:

updating a regulator, in particular gain factors, as a function of the model, in particular matrices characterizing the model, and as a function of the pendulum length; and the determination of the at least one variable being carried out as a function of the updated regulator.

13. The tower crane of claim 1, wherein the trolley further comprises:

a carriage for moving the trolley along the trolley boom;

at least two deflection pulleys, which are arranged fixedly with respect to the carriage, for deflecting the hoisting cable in the direction of the load receiving means; and a sensor device arranged fixedly with respect to the carriage for determining at least one deflection angle of a section of the hoisting cable located between the trolley and a load receiving means with respect to the perpendicular running through the trolley.

14. The tower crane according to claim 13, wherein at least one sensor signal generated by the sensor device represents a distance between the sensor device and at least one section of the hoisting cable.

15. The tower crane according to claim 13, wherein at least two sensors are associated with the at least one section of the hoisting cable, which sensors are directed at the section of the hoisting cable from different angles.

16. The tower crane according to claim 13, wherein the sensor device is arranged at least in part between the at least two sections of the hoisting cable.

17. The tower crane according to claim 13, comprising:

at least one further sensor device fixedly arranged with respect to the carriage for generating at least one further sensor signal characterizing an inclination of the trolley with respect to a horizontal.

18. The tower crane according to claim 1, wherein the trolley travelling winch further comprises:

a frame;

a drive unit fixed to the frame for winding and unwinding a trolley wire; and a sensor device fixedly disposed to the frame for detecting a rotational angle difference between a rotational angle of the trolley boom about a vertical axis of a tower of the tower crane and a rotational angle of the trolley about the vertical axis.

19. The tower crane according to claim 18, wherein a sensor signal generated by the sensor device for determining the angle of rotation difference represents a distance between the sensor device and a section of the trolley cable.

20. The tower crane of claim 1, wherein the control unit further comprises:

means for determining at least the first deflection angle, lying in the first plane, of the load receiving means suspended from the trolley by means of the hoisting cable with respect to the perpendicular running through the load receiving means;

means for determining at least the second deflection angle of at least the section of the hoisting cable located between the trolley and the load receiving means with respect to the perpendicular passing through the trolley;

means for determining at least one angle of rotation of the trolley about the vertical axis of the tower; and means for determining at least one variable for operating the rotating mechanism, the hoisting mechanism and the trolley, as a function of the at least one first deflection angle, as a function of the at least one second deflection angle and as a function of the at least one angle of rotation.

* * * * *